(12) United States Patent
Wasterlund et al.

(10) Patent No.: US 12,325,077 B2
(45) Date of Patent: Jun. 10, 2025

(54) CLAMPING DEVICE FOR TOOL HOLDER

(71) Applicant: AB SANDVIK COROMANT, Sandviken (SE)

(72) Inventors: Jonas Wasterlund, Toyokawa (JP); Gunnar Matlik, Sandviken (SE)

(73) Assignee: AB Sandvik Coromant, Sandviken (SE)

( * ) Notice: Subject to any disclaimer, the term of this patent is extended or adjusted under 35 U.S.C. 154(b) by 389 days.

(21) Appl. No.: 17/800,091

(22) PCT Filed: Feb. 2, 2021

(86) PCT No.: PCT/EP2021/052364
§ 371 (c)(1),
(2) Date: Aug. 16, 2022

(87) PCT Pub. No.: WO2021/165028
PCT Pub. Date: Aug. 26, 2021

(65) Prior Publication Data
US 2023/0146914 A1    May 11, 2023

(30) Foreign Application Priority Data

Feb. 17, 2020  (EP) ..................................... 20157695

(51) Int. Cl.
*B23B 31/26*  (2006.01)
*B23B 31/12*  (2006.01)

(52) U.S. Cl.
CPC ............ *B23B 31/265* (2013.01); *B23B 31/12* (2013.01); *B23B 2260/02* (2013.01); *B23B 2260/034* (2013.01); *Y10T 409/309464* (2015.01)

(58) Field of Classification Search
CPC ............ B23B 31/265; B23B 2260/034; Y10T 409/309464
See application file for complete search history.

(56) References Cited

U.S. PATENT DOCUMENTS 3,026,128 A * 10/1962 Willis ...................... F16L 37/10
                                                  285/364
4,075,927 A    2/1978 Frazier
(Continued)

FOREIGN PATENT DOCUMENTS

EP     2774717 A1 *  9/2014  ........... B23B 31/113
EP     1468767 B1   12/2016
WO     02/14700 A2   2/2002

*Primary Examiner* — Sunil K Singh
*Assistant Examiner* — Dustin James Trujillo
(74) *Attorney, Agent, or Firm* — Corinne R. Gorski

(57) ABSTRACT

A clamping device for releasably holding a tool holder shank includes a housing, a drawbar axially moveable in a bore in the housing, engagement members moveable under the effect of the drawbar into locking engagement with the tool holder shank, and an actuating member rotatably arranged in the bore. Upon rotation of the actuating member, a contact surface on a motion transferring element fixedly connected to the actuating member achieves an axial movement of the drawbar by pressing against a contact surface on another motion transferring element fixedly connected to the drawbar. At least one of the contact surfaces includes two sections with mutually different pitch, such that the same angular displacement of the actuating member, when rotated in a first rotary direction, results in a longer axial movement of the drawbar in a first phase of the rotary movement than in a final phase thereof.

15 Claims, 12 Drawing Sheets

(56) References Cited

U.S. PATENT DOCUMENTS 5,193,954 A     3/1993   Hunt
2016/0052064 A1     2/2016   Matlik
2018/0339383 A1*   11/2018   Park .................... B23B 31/265

\* cited by examiner

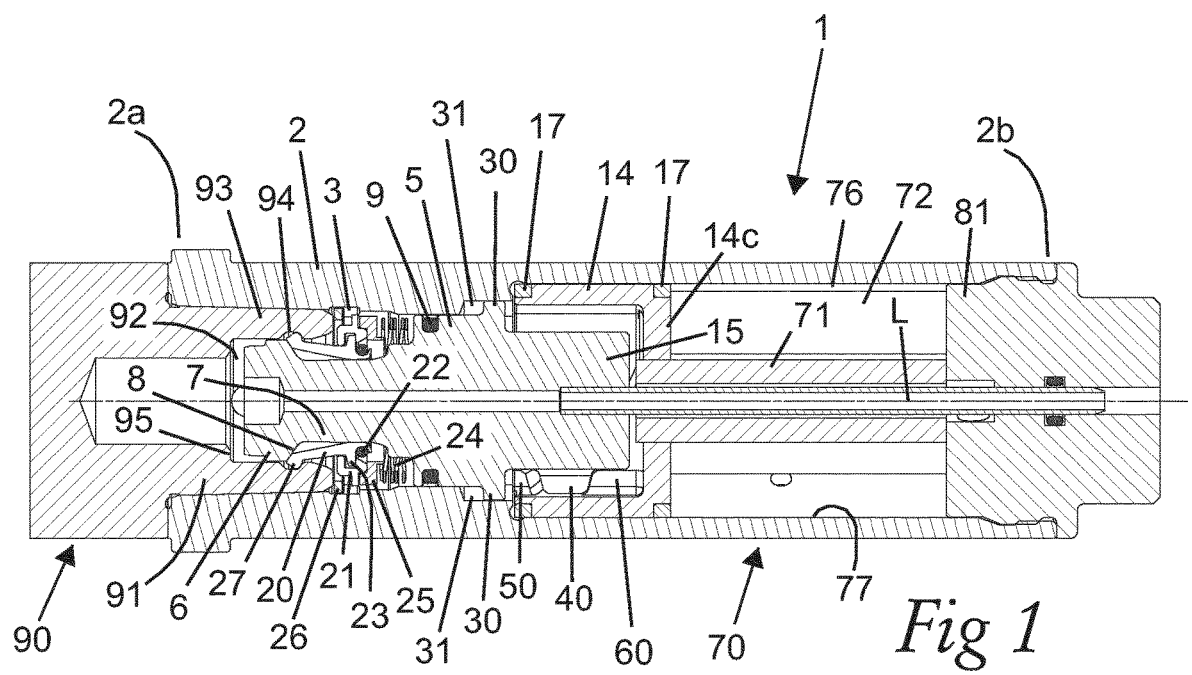
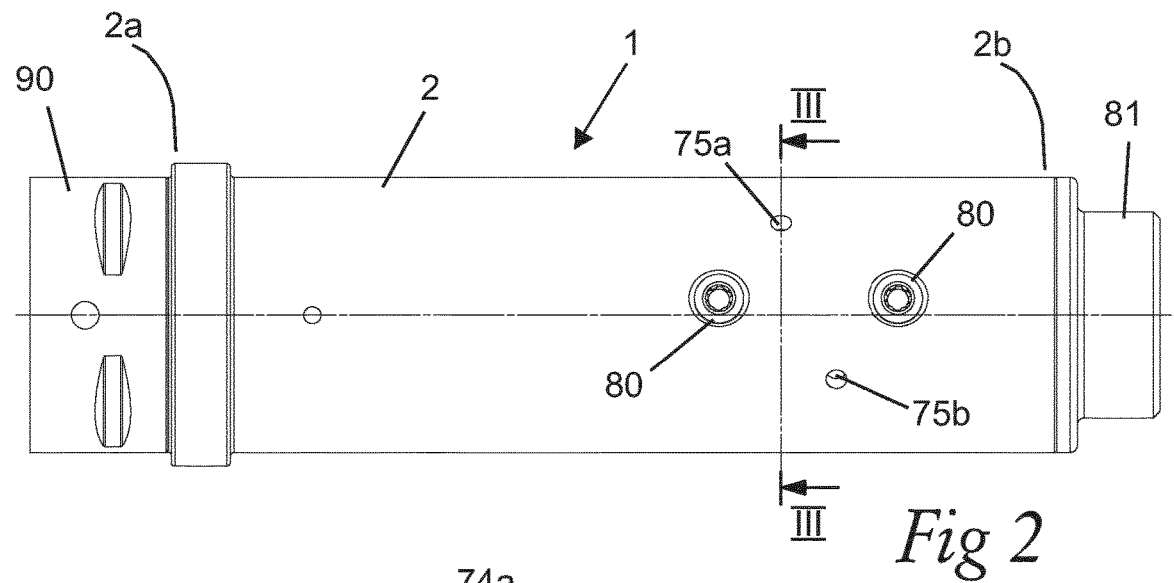
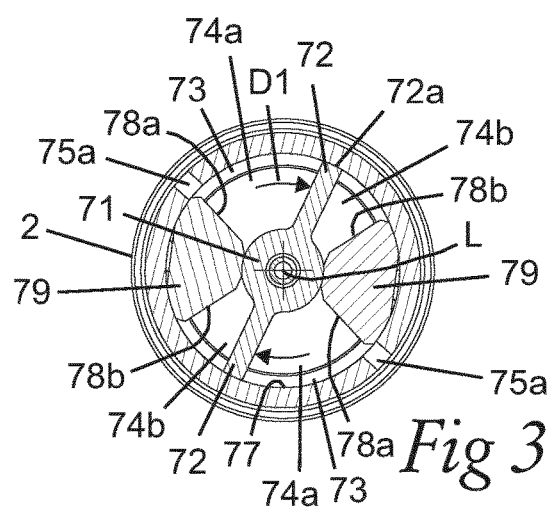

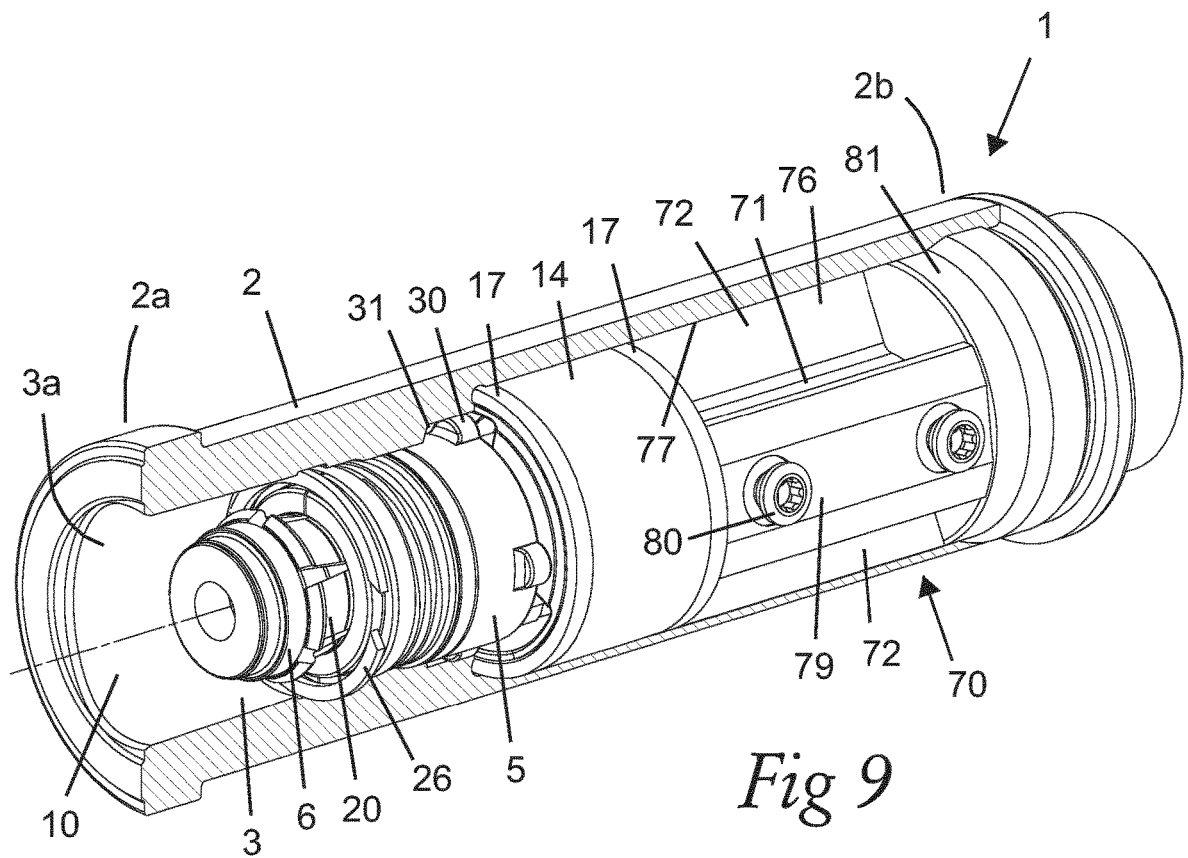
*Fig 9*
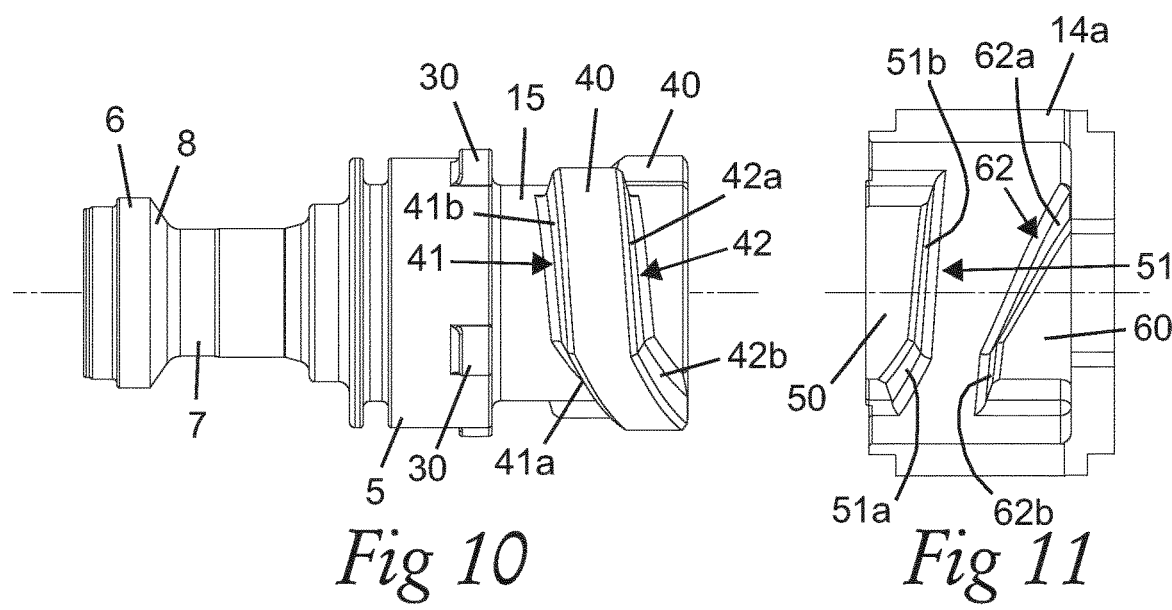
*Fig 10*  *Fig 11*

CLAMPING DEVICE FOR TOOL HOLDER

RELATED APPLICATION DATA

This application is a § 371 National Stage Application of PCT International Application No. PCT/EP2021/052364 filed Feb. 2, 2021 claiming priority to EP 20157695.6 filed Feb. 17, 2020.

FIELD OF THE INVENTION AND PRIOR ART

The present invention relates to a clamping device according to the preamble of claim 1, which is intended to be used for connecting a tool holder to a machine tool.

Within the field of machine tools for metal cutting, the cutting tools, for instance in the form of drills, milling tools or lathe tools, used for machining work pieces of metallic material are often fixed to a tool holder, which in its turn may be detachably fixed to a clamping device that is mounted to a machine tool. It is previously know to clamp a shank of such a tool holder to the housing of a clamping device by means of a clamping mechanism arranged in the housing. Tool holders for cutting tools in the form of drills and milling tools are normally clamped to a rotatable housing in the form of a spindle, whereas tool holders for lathe tools may be clamped to a non-rotatably arranged housing. When the cutting tool needs to be exchanged, the tool holder is released from the housing of the clamping device and a new tool holder with another cutting tool is clamped to the housing. A clamping device of this type may for instance be detachably fixed at the periphery of a tool turret included in a machine tool.

Many previously known clamping devices of the above-mentioned type require manual operation in order to effect clamping or releasing of a tool holder. There also exist clamping devices adapted for automatic tool changing operations, where for instance a hydraulic piston is used to control the state of the clamping mechanism. However, such automatically operated clamping mechanisms are normally rather bulky and require much space, particularly in a longitudinal direction, which make them unsuitable for use with a tool turret of a machine tool where the available axial space for the clamping device is limited.

A clamping device comprising a housing in the form of a spindle with a clamping mechanism adapted for an automatic tool changing operation is previously known from EP 1 468 767 B1. In the clamping device according to EP 1 468 767 B1, an actuating member in the form of a first drawbar is slidably mounted inside the spindle and configured to effect an axial displacement of a second drawbar via a force amplifying mechanism comprising a number of co-operating wedges arranged between the drawbars. A gas spring inside the spindle is configured to urge the two drawbars into a retracted locking position, in which a tool holder is clamped to the spindle, and a hydraulic piston may be configured to act on a piston at the rear end of the gas spring in order to achieve a displacement of the two drawbars into an advanced releasing position, in which the tool holder may be released from the spindle. However, this previously known clamping device has a relatively long axial extent and it is therefore not suitable to use this type of clamping device when tool holders are to be detachably fixed at the periphery of a tool turret where the available axial space for the clamping device is limited.

OBJECT OF THE INVENTION

The object of the present invention is to provide a clamping device of the above-mentioned type that has a new and favourable design and that is suitable for use with a tool turret of a machine tool.

SUMMARY OF THE INVENTION

According to the invention, said object is achieved by means of a clamping device having the features defined in claim 1.

The clamping device according to the invention comprises:
  a housing having a front end, a rear end and a bore which intersects the front end and extends rearwardly therefrom, wherein a mounting portion for receiving the tool holder shank is provided at a front end of the bore;
  a drawbar slidably mounted inside the bore so as to be reciprocally moveable in the bore along a longitudinal axis thereof between an advanced releasing position and a retracted locking position;
  engagement members arranged around the drawbar at a front end thereof, wherein the engagement members, under the effect of a movement of the drawbar from the advanced releasing position to the retracted locking position, are moveable from a first position, in which the engagement members allow the tool holder shank to move into and out of said mounting portion of the bore, to a second position, in which the engagement members are in locking engagement with the tool holder shank and keep it secured to the housing;
  an actuating member rotatably arranged in the bore so as to be rotatable about the longitudinal axis, wherein the actuating member is axially fixed in relation to the housing so as to be prevented from moving along the longitudinal axis; and
  a motion transferring mechanism arranged inside the housing, wherein the motion transferring mechanism is configured to transfer a rotary movement of the actuating member in a first rotary direction in relation to the housing into an axial movement of the drawbar from the advanced releasing position to the retracted locking position.

The above-mentioned motion transferring mechanism comprises:
  a first motion transferring element, which is fixed to or fixedly connected to the drawbar so as to be moveable along the longitudinal axis together with the drawbar and which is provided with a first pressure receiving contact surface facing towards the front end of the housing; and
  a second motion transferring element, which is fixed to the actuating member so as to be rotatable in relation to the housing and the drawbar together with the actuating member and which is provided with a first pressure applying contact surface facing towards the rear end of the housing for contacting the first pressure receiving contact surface, wherein the first pressure applying contact surface is configured to press the drawbar from the advanced releasing position to the retracted locking position by sliding and pressing against the first pressure receiving contact surface when the actuating member is rotated in the first rotary direction.

By using the above-mentioned actuating member and motion transferring mechanism for controlling the axial movement of the drawbar, no gas spring or the similar that takes up a lot of space in the axial direction is required for controlling the axial movement of the drawbar, which implies that the clamping device can be made compact in axial direction. The clamping device is therefore suitable for use in tool turrets.

According to the invention, at least one of the above-mentioned contact surfaces, i.e. at least one of the first pressure receiving contact surface and the first pressure applying contact surface, comprises a first contact surface section and a second contact surface section arranged at different positions along the associated motion transferring element, such that, upon a movement of the actuating member in the first rotary direction, the first contact surface section is configured to slide against the other contact surface during a first phase of the movement and the second contact surface section is configured to slide against the other contact surface during a final phase of the movement, wherein the first contact surface section has a larger pitch than the second contact surface section such that the same angular displacement of the actuating member in connection with a rotation thereof in the first rotary direction in relation to the housing results in a longer axial movement of the drawbar in said first phase than in said final phase. Hereby, the drawbar may be quickly moved in axial direction during the initial phase of the clamping under the effect of the larger pitch. This initial clamping phase does not require much force. However, the final phase of the clamping will require larger force. When the actual clamping occurs, i.e. when the engagement members assume the above-mentioned second position, the drawbar is moved in axial direction under the effect of the smaller pitch such that the axial movement of the drawbar will be small as compared to the angular displacement of the actuating member, which results in a force-amplifying effect, also referred to as "power boost". By using a larger pitch for the initial axial movement of the drawbar, it will be possible to achieve the entire axial movement of the drawbar from the advanced releasing position to the retracted locking position with a rather small angular displacement of the actuating member.

The above-mentioned housing of the clamping device may have the form of a rotatable spindle, which may be connected or connectable to a drive mechanism in a tool turret of a machine tool. However, the clamping device of the present invention is not limited to use in a tool turret and such a housing in the form of a rotatable spindle could as an alternative constitute the main spindle of a machine tool or be connected to such a main spindle without any intermediate tool turret. When the housing has the form of a rotatable spindle, the clamping device may be used for clamping tool holders provided with drilling or milling tools or other types of rotating tools. The housing included in the clamping device of the present invention may as a further alternative be a non-rotatable housing. In the latter case, the clamping device may be used for clamping tool holders provided with lathe tools or other types of non-rotating tools.

According to an embodiment of the invention, the pitch is constant along said second contact surface section. The pitch is preferably also constant along said first contact surface section, but of course larger than the pitch of the second contact surface section. The use of a constant first pitch along the first contact surface section and/or a constant second pitch along the second contact surface section will facilitate the manufacturing of the motion transferring elements. However, as an alternative, the first contact surface section and/or the second contact surface section may have a pitch that varies along the contact surface section in question.

Said second contact surface section is preferably positioned on the associated motion transferring element adjacent to said first contact surface section, such that the second contact surface section follows directly after the first contact surface section. However, as an alternative, one or more intermediate contact surface sections with a constant or varying pitch that deviates from the pitches of the first and second contact surface sections may be provided between the first and second contact surface sections on the motion transferring element in question.

According to another embodiment of the invention, said second contact surface section has such a pitch that the first and second motion transferring elements will keep the actuating member in a self-locking rotary position in relation to the drawbar when the drawbar has been forced into the retracted locking position under the effect of the actuating member and the first and second motion transferring elements. Hereby, the drawbar can be held in the retracted locking position without requiring any external force from an actuator, which implies that the actuating member only needs to be subjected to external force from an actuator, for instance in the form of a hydraulic actuator, in connection with a tool changing operation.

According to another embodiment of the invention, the motion transferring mechanism is configured to transfer a rotary movement of the actuating member in a second rotary direction, opposite to the first rotary direction, into an axial movement of the drawbar from the retracted locking position to the advanced releasing position. Hereby, the actuating member may also be used for effecting a movement of the drawbar from the retracted locking position to the advanced releasing position in connection with a tool changing operation.

According to another embodiment of the invention, the motion transferring mechanism comprises two or more sets of such motion transferring elements, each set comprising a first motion transferring element and an associated second motion transferring element, wherein these sets are spaced apart from each other in the circumferential direction of the actuating member. Said sets are preferably evenly distributed in the circumferential direction of the actuating member. Hereby, a well-balanced clamping device with good force distribution is obtained.

Further advantageous features of the clamping device according to the present invention will appear from the description following below and the dependent claims.

BRIEF DESCRIPTION OF THE DRAWINGS

With reference to the appended drawings, a specific description of embodiments of the invention cited as examples follows below. In the drawings:

FIG. 1 is a longitudinal section through a clamping device according to an embodiment of the present invention and a tool holder, with the drawbar of the clamping device in a retracted locking position and with the tool holder clamped to the housing of the clamping device, FIG. 2 is a lateral view of the clamping device and tool holder shown in FIG. 1, FIG. 3 is a cross-section according to the line III-III in FIG. 2, FIG. 9 is a partly cut perspective view of the clamping device of FIG. 1, FIG. 10 is a lateral view of a component included in the clamping device of FIG. 1, FIG. 11 is a lateral view of a part of the actuating member included in the clamping device of FIG. 1.

DETAILED DESCRIPTION OF EMBODIMENTS OF THE INVENTION

Figure 4:
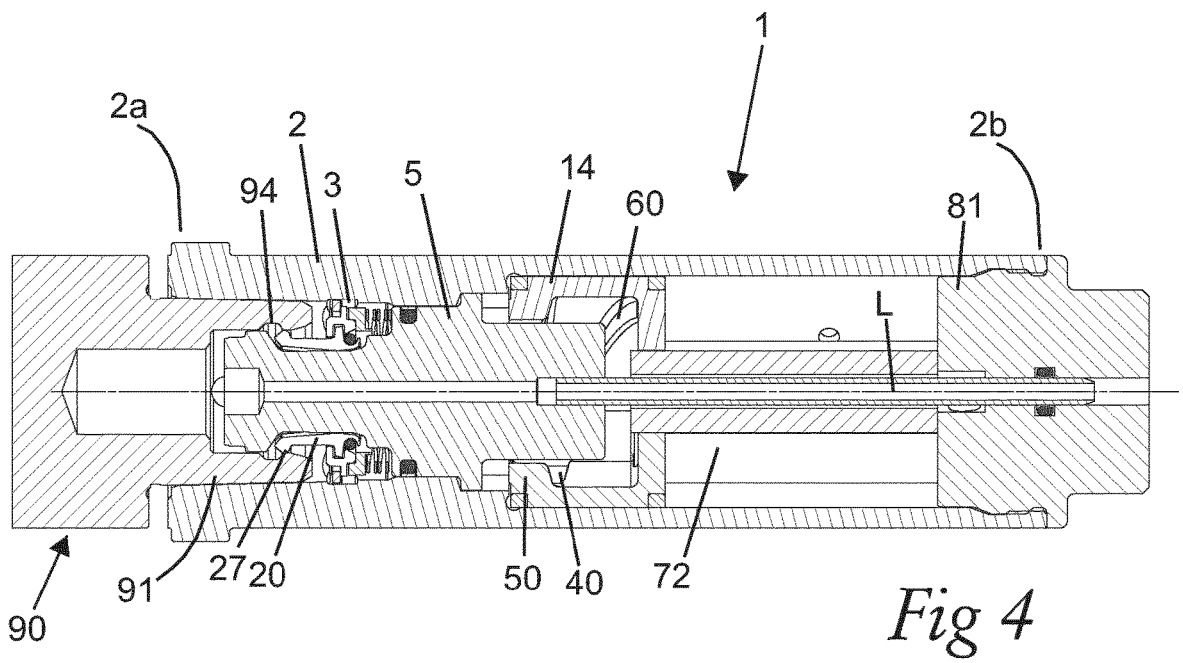
FIG. 4 is a longitudinal section corresponding to FIG. 1, with the drawbar shown in an advanced releasing position.
Figure 5:
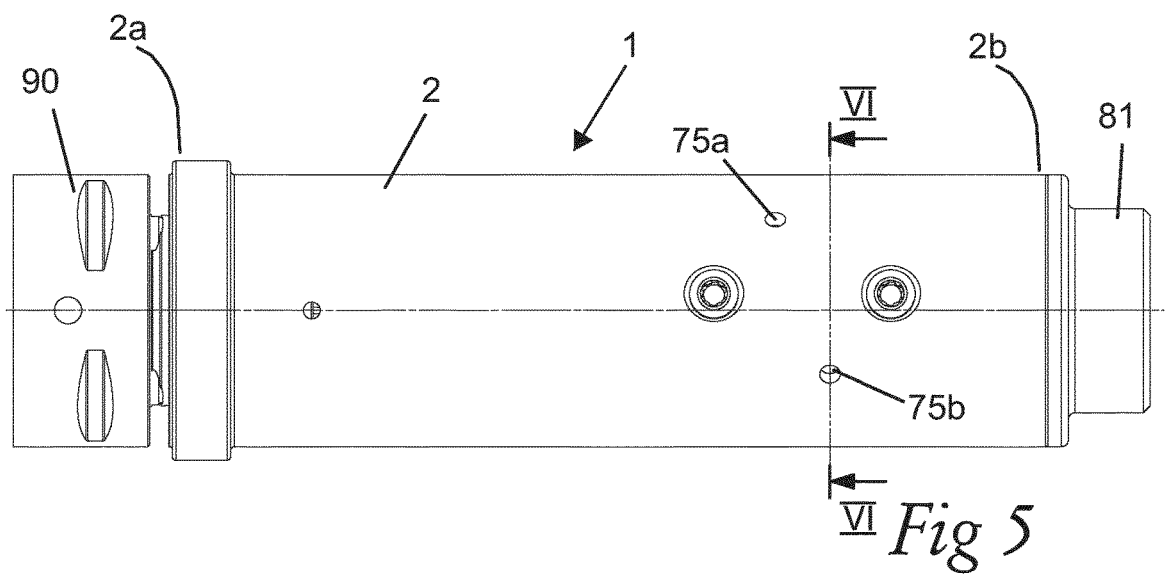
FIG. 5 is a lateral view of the clamping device and tool holder shown in FIG. 4.

A clamping device 1 according to different embodiments of the present invention is illustrated in FIGS. 1-23. The clamping device 1 is configured to releasably clamp a tool holder 90 (very schematically illustrated in the drawings) to a housing 2 of the clamping device and enable the machining of a work piece by means of a cutting tool (not shown) fixed to the tool holder 90.

The housing 2 has a front end 2a, a rear end 2b and a bore 3 which intersects the front end 2a and extends rearwardly therefrom. Thus, the bore 3 has an entrance opening 3a at the front end 2a of the housing.

In the embodiment illustrated in FIGS. 1-11, the housing 2 has the form of a machine spindle, and this spindle-shaped housing 2 may be rotatably mounted in a surrounding casing by means of rolling bearings. In this case, the housing 2 may be connectable to a drive mechanism of a machine tool, for instance a drive mechanism in a tool turret of a machine tool, in order to allow the housing 2 to be driven in rotation by the drive mechanism.

In the embodiment illustrated in FIG. 12-23, the housing 2 is designed as a non-rotatable housing. In this case, the housing 2 is connectable to a tool turret of a machine tool via a connection member 4, which extends from the housing 2 at the rear end thereof.

Figure 14:
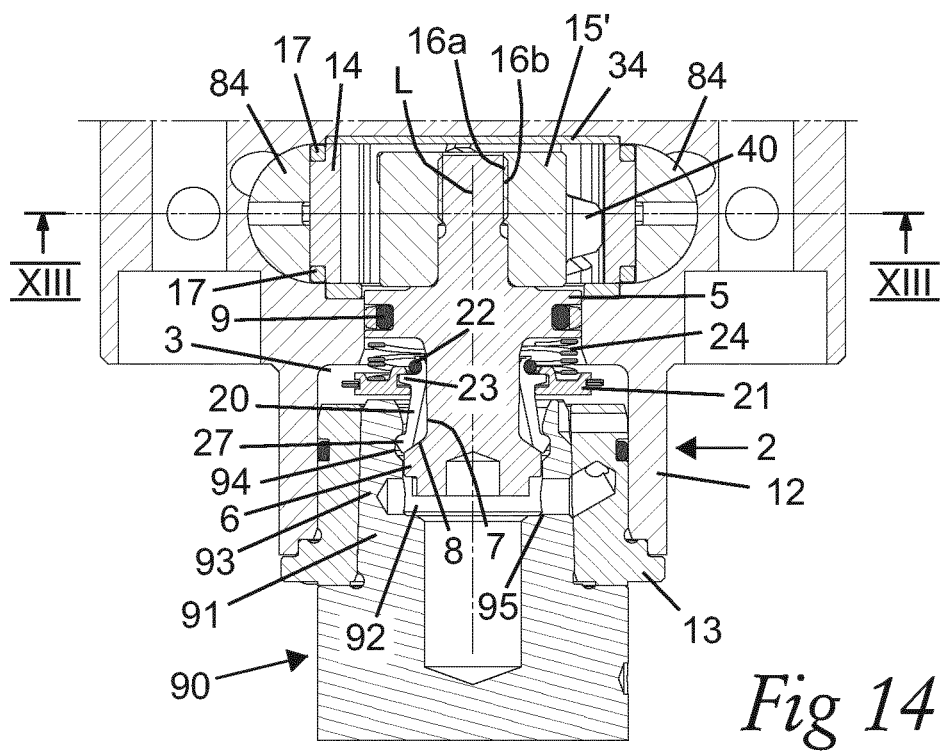
FIG. 14 is a longitudinal section through a part of the clamping device according to the line XIV-XIV in FIG. 13.
Figure 15:
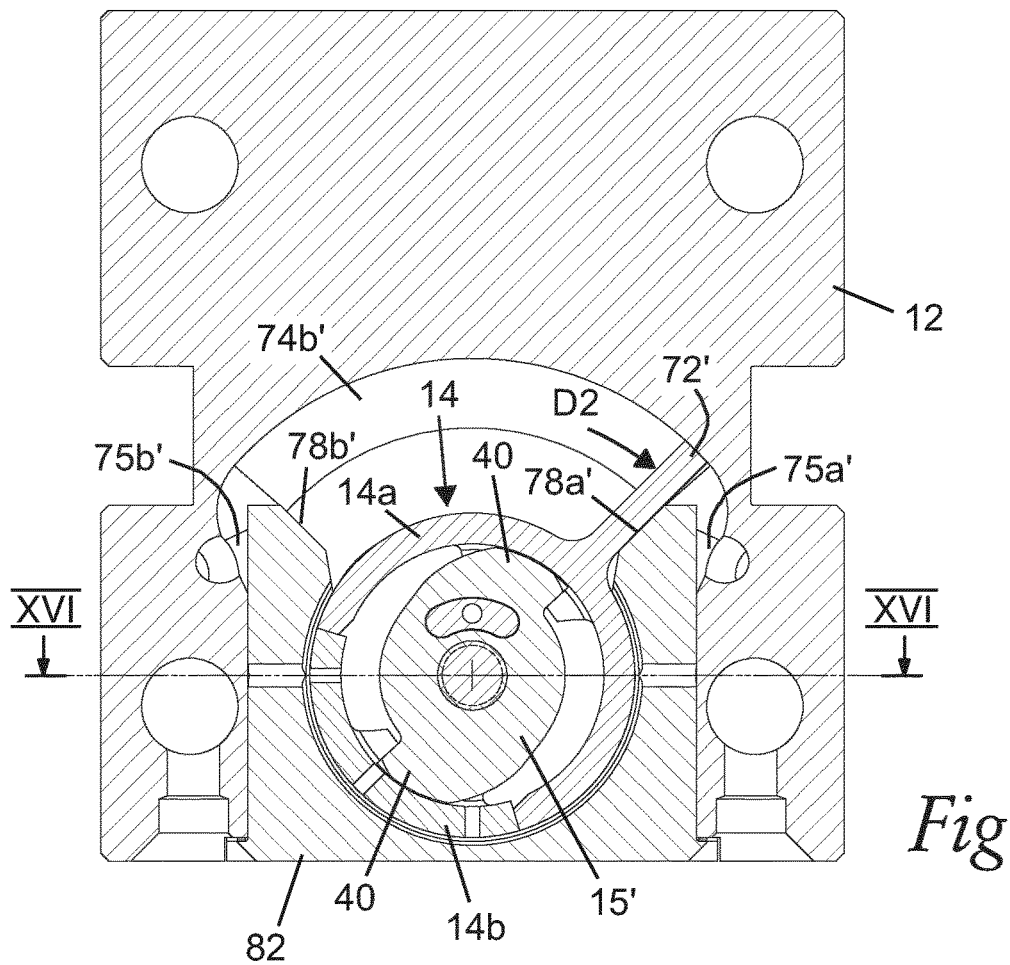
FIG. 15 is a cross-section corresponding to FIG. 13, but with the actuator vane shown in a second position.

A drawbar 5 is slidably mounted inside the bore 3 so as to be reciprocally moveable in the bore 3 along a longitudinal axis L thereof between an advanced releasing position (see FIGS. 4 and 16) and a retracted locking position (see FIGS. 1 and 14). The drawbar 5 has a front end facing the entrance opening 3a of the bore 3 and an opposite rear end. A head portion 6 and a neck portion 7 are provided at the front end of the drawbar 5. The head portion 6 is located in front of the neck portion 7 as seen in the longitudinal direction of the drawbar, wherein the head portion 6 is connected to the neck portion 7 via a rearwardly facing bevelled surface 8 on the head portion 6. A sealing ring 9 is arranged between the drawbar 5 and an inner surface of the bore 3. In the illustrated examples, this sealing ring 9 is received in a groove on the outer side of the drawbar 5.

A mounting portion 10 for receiving a mounting shank 91 on the tool holder 90 is provided at a front end of the bore 3. This mounting shank 91 is here referred to as tool holder shank.

In the embodiment illustrated in FIGS. 12-23, the housing 2 comprises a base part 12 and an end piece 13 mounted to the base part 12 at the front end 2a of the housing. The end piece 13 has the form of a sleeve with an axial through hole that forms part of the above-mentioned bore 3. In this case, the above-mentioned mounting portion 10 is located within the end piece 13.

In the embodiment illustrated in FIGS. 1-11, the part of the housing 2 accommodating the bore 3 is formed in one piece without any end piece 13 of the above-mentioned type.

The tool holder shank 91 is insertable into the mounting portion of the bore 3 via the entrance opening 3a at the front end 2a of the housing 2. The head portion 6 of the drawbar is received in an engagement bore 92 in the tool holder shank 91 and a tubular wall 93 of the tool holder shank is received in a space between the head portion 6 and an inner surface of the bore 3. In the illustrated embodiments, the mounting portion 10 of the bore 3 is conically shaped and has a somewhat "triangular" or polygonal, non-circular cross-sectional shape adapted to receive a similarly shaped tool holder shank 91. The conical shape ensures a connection free from play in the radial as well as the axial direction between the tool holder shank 91 and the housing 2, whereas the non-circular cross-section ensures a non-rotatable fixation of the tool holder shank 91 to the housing 2. However, the mounting portion 10 of the bore 3 could also have any other suitable shape for receiving other types of tool holder shanks.

Engagement members 20 in the form of segments are arranged around the drawbar 5 at a front end thereof. Under the effect of a movement of the drawbar 5 from the advanced releasing position to the retracted locking position, the engagement members 20 are moveable from a first position (see FIGS. 4 and 16), in which the engagement members 20 allow the tool holder shank 91 to move into and out of the mounting portion of the bore 3, to a second position (see FIGS. 1 and 14), in which the engagement members 20 are in locking engagement with an engagement groove 94 in the engagement bore 92 in the tool holder shank 91 and thereby keep the tool holder shank 91 secured to the housing 2.

In the illustrated embodiments, the engagement members 20 are arranged around the neck portion 7 of the drawbar 5 and held in place around the neck portion by means of a retainer ring 21 and an elastic O-ring 22, which are arranged in the bore 3 and surround the neck portion 7. Each engagement member 20 has an outwardly facing flange portion 23 engaged in an inner groove in the retainer ring 21. The O-ring 22 is received in an outwardly facing groove at the rear end of each engagement member 20. A compression spring 24 is also arranged in the bore 3 and configured to surround the drawbar 5. The compression spring 24 is mounted between a shoulder on the drawbar 5 and a thrust ring 25 in the embodiment illustrated in FIGS. 1-11 between a shoulder on the drawbar 5 and the retainer ring 21 in the embodiment illustrated in FIGS. 12-23. The compression spring 24 is configured to urge the retainer ring 21 and the engagement members 20 forwards. In the embodiment illustrated in FIGS. 1-11, the forward movement of the retainer ring 21 towards the entrance opening of the bore 3 is limited by a stop ring 26, which is mounted in a groove in an inner surface of the bore 3. In the embodiment illustrated in FIGS. 12-23, the forward movement of the retainer ring 21 towards the entrance opening of the bore 3 is limited by a shoulder on an inner end surface of the end piece 13.

Figure 16:
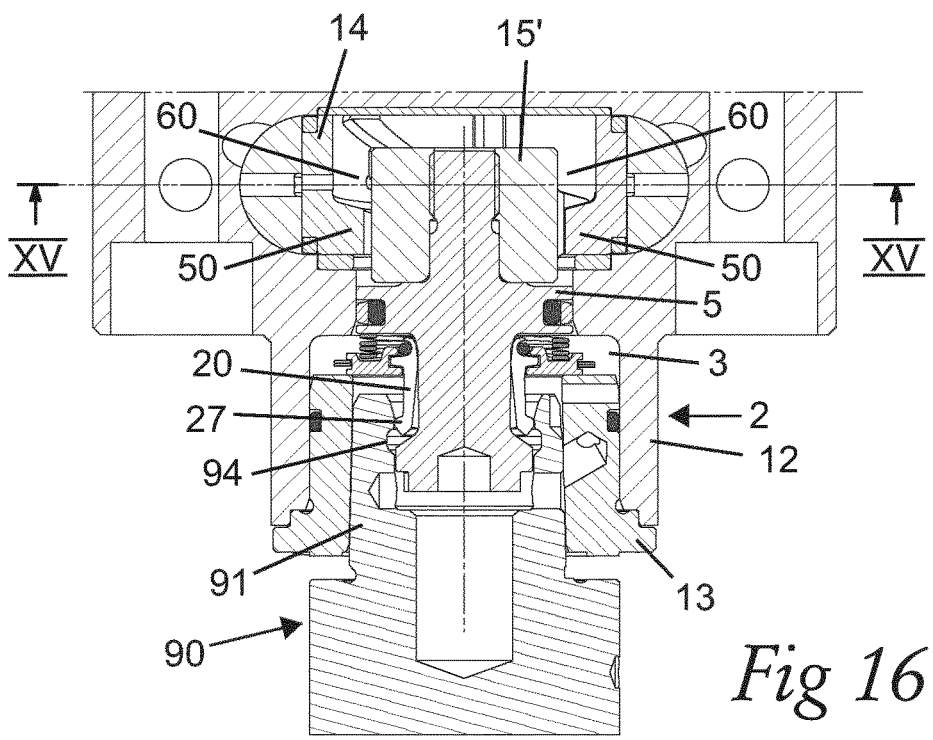
FIG. 16 is a longitudinal section through a part of the clamping device according to the line XVI-XVI in FIG. 15.
Figure 17:
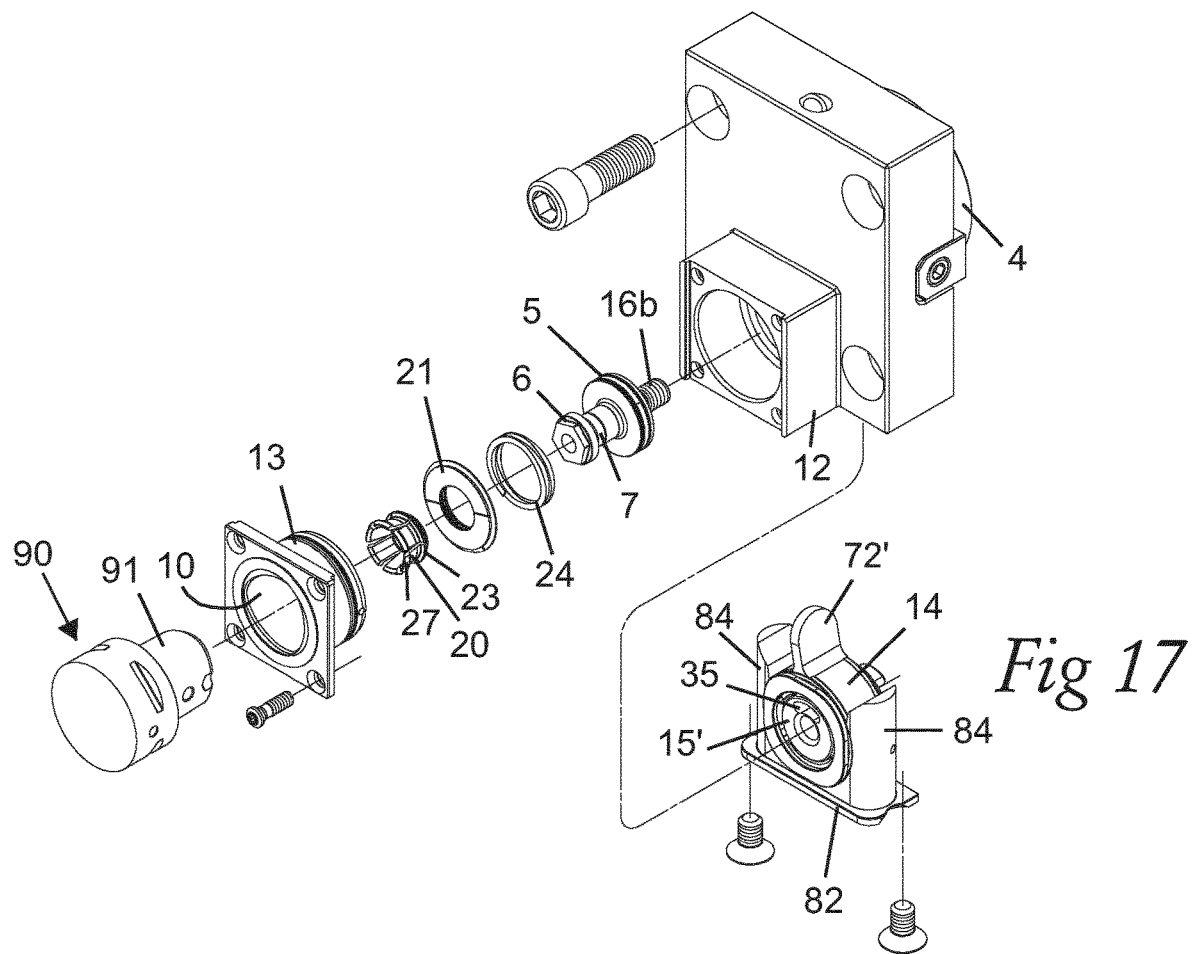
FIG. 17 is an exploded view of the clamping device and tool holder of FIG. 12.
Figure 18:
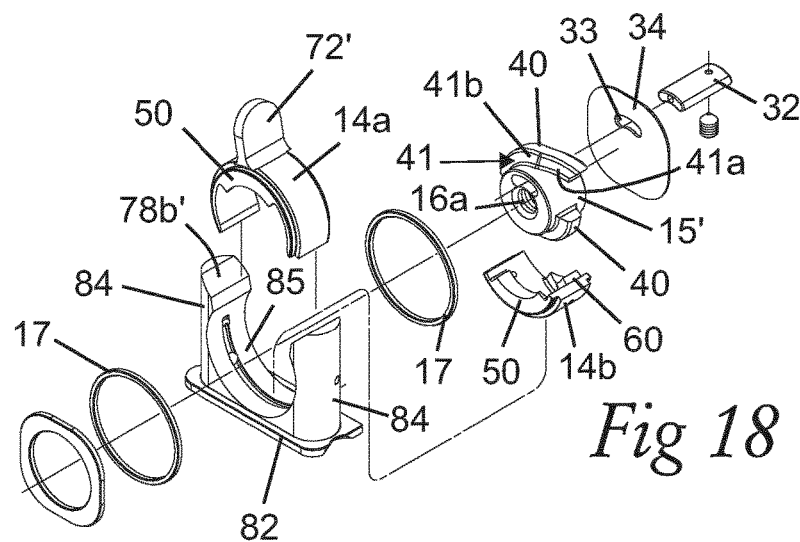
FIG. 18 is an exploded view of a part shown in an assembled state in FIG. 17.
Figure 19:
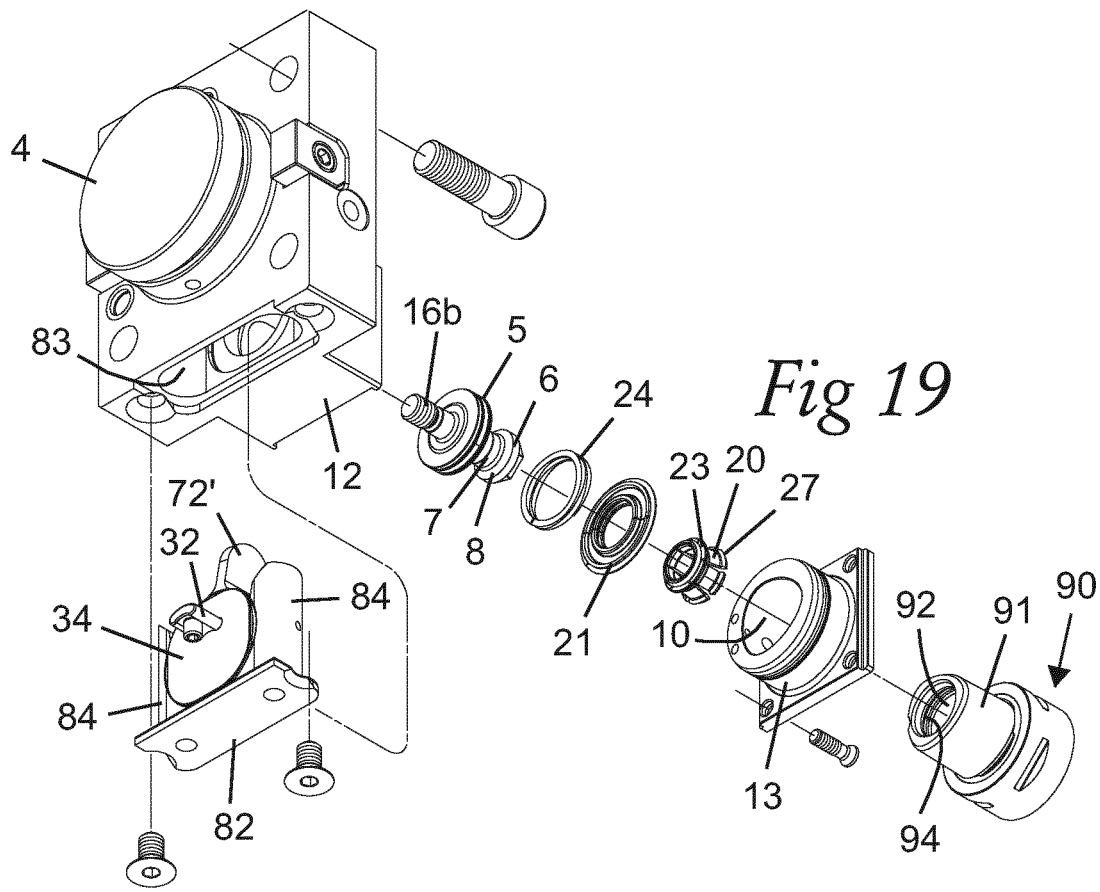
FIG. 19 is an exploded view from another direction of the clamping device and tool holder of FIG. 12.
Figure 20:
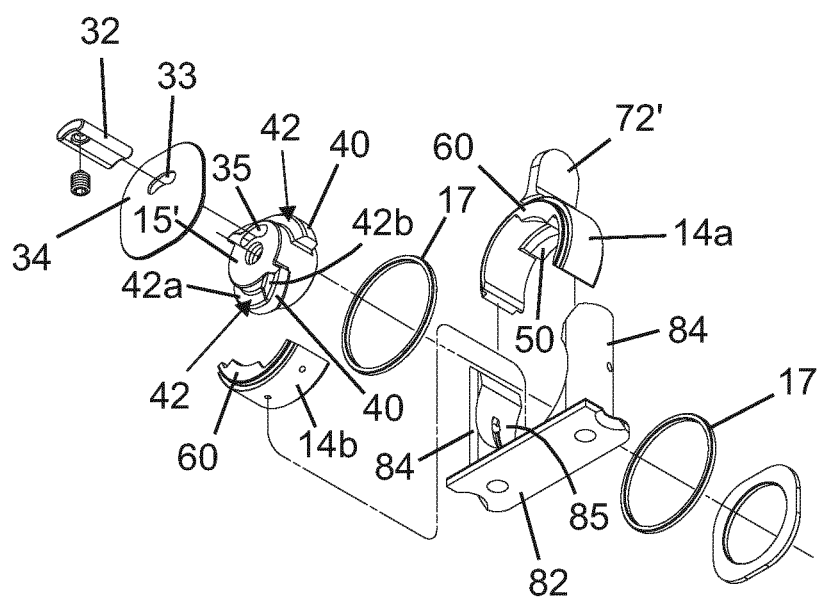
FIG. 20 is an exploded view corresponding to FIG. 18 but seen from a another direction.
Figure 21:
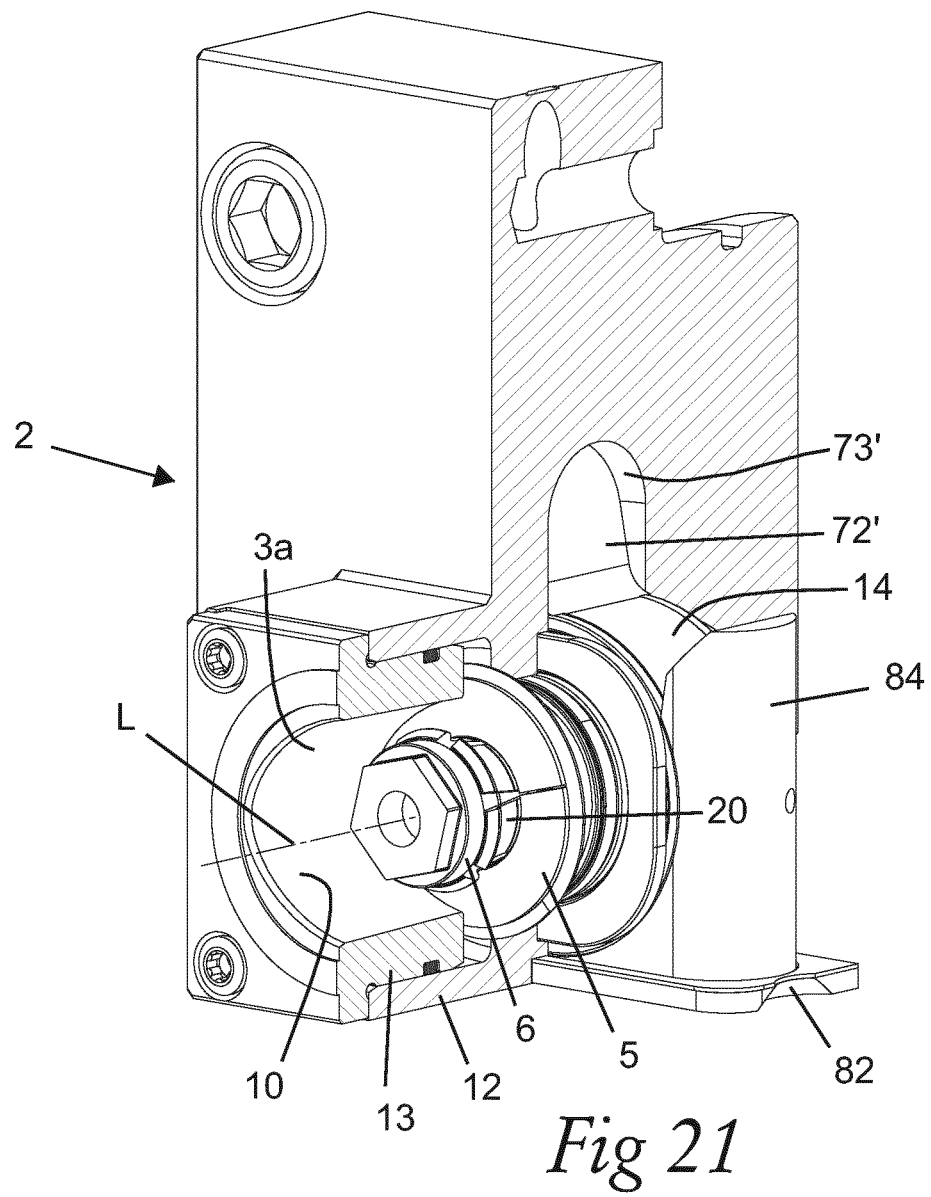
FIG. 21 is a partly cut perspective view of the clamping device of FIG. 12.
Figure 22:
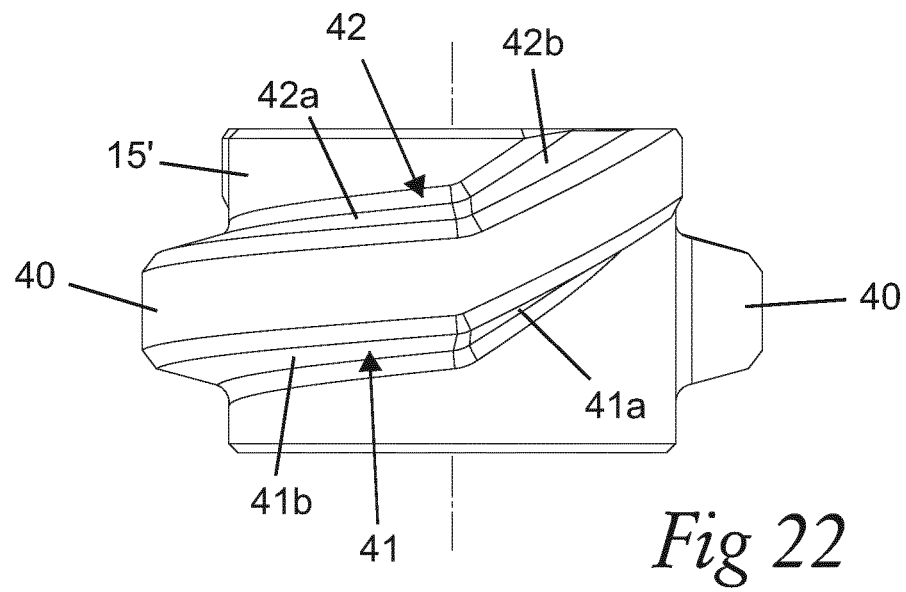
FIG. 22 is a lateral view of a component included in the clamping device of FIG. 12.
Figure 23:
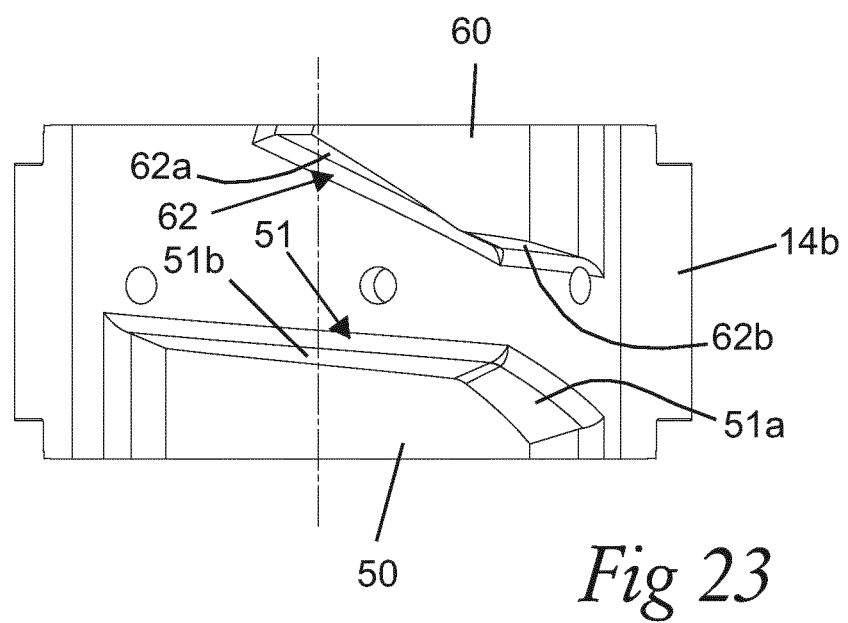
FIG. 23 is a lateral view of a part of the actuating member included in the clamping device of FIG. 12.

At its front end, each engagement member 20 is provided with an outwardly directed engagement flange 27, which is configured to be in engagement with the engagement groove 94 in the tool holder shank 91 when the engagement member 20 is in the above-mentioned second position. When the drawbar 5 is in the advanced releasing position, the front ends of the engagement members 20 are located behind the head portion 6 of the drawbar 5 and the engagement flanges 27 are out of engagement with the engagement groove 94 in the tool holder shank 91, as illustrated in FIGS. 4 and 16. When the drawbar 5 is moved axially rearwards in the bore 3 along the longitudinal axis L thereof, the bevelled surface 8 on the head portion 6 of the drawbar will come into contact with the front ends of the engagement members 20, wherein the front ends of the engagement members 20 will slide on this bevelled surface 8 and be pressed outwards so that the engagement flanges 27 on the engagement members come into engagement with the engagement groove 94 in the tool holder shank 91, whereupon the tool holder shank 91 will be pulled by the drawbar 5 into firm contact with inner surfaces of the housing 2 at the above-mentioned mounting portion 10.

The clamping device 1 further comprises an actuating member 14, which is rotatably arranged in the bore 3 so as to be rotatable in relation to the drawbar 5 and the housing 2 about the longitudinal axis L and which is axially fixed in relation to the housing 2 so as to be prevented from moving in relation to the housing 2 along the longitudinal axis L. The actuating member 14 is concentric with the drawbar 5.

A motion transferring mechanism is arranged inside the housing 2 and configured to transfer a rotary movement of the actuating member 14 in a first rotary direction D1 in relation to the housing 2 into an axial movement of the drawbar 5 from the advanced releasing position to the retracted locking position. This motion transferring mechanism comprises:
  a first motion transferring element 40, which is fixed to or fixedly connected to the drawbar 5 so as to be moveable along the longitudinal axis L together with the drawbar and which is provided with a first pressure receiving contact surface 41 facing towards the front end 2a of the housing; and
  a second motion transferring element 50, which is fixed to the actuating member 14 so as to be rotatable in relation to the housing 2 and the drawbar 5 together with the actuating member and which is provided with a first pressure applying contact surface 51 facing towards the rear end 2b of the housing for contacting the first pressure receiving contact surface 41.

The first pressure applying contact surface 51 is configured to press the drawbar 5 from the advanced releasing position to the retracted locking position by sliding and pressing against the first pressure receiving contact surface 41 when the actuating member 14 is rotated in the first rotary direction D1.

The first pressure receiving contact surface 41 comprises a first contact surface section 41a and a second contact surface section 41b arranged at different positions along the first motion transferring element 40. The first pressure applying contact surface 51 comprises a first contact surface section 51a and a second contact surface section 51b arranged at different positions along the second motion transferring element 50. Upon a movement of the actuating member 14 in the first rotary direction D1, the first section 51a of the first pressure applying contact surface 51 is configured to slide and press against the first section 41a of the first pressure receiving contact surface 41 during a first phase of the movement and the second section 51b of the first pressure applying contact surface 51 is configured to slide and press against the second section 41b of the first pressure receiving contact surface 41 during a final phase of the movement. The first section 41a of the first pressure receiving contact surface 41 has a larger pitch than the second section 41b thereof. Likewise, the first section 51a of the first pressure applying contact surface 51 has a larger pitch than the second section 51b thereof. Hereby, the same angular displacement of the actuating member 14 in connection with a rotation thereof in the first rotary direction D1 in relation to the housing 2 will result in a longer axial movement of the drawbar 5 along the longitudinal axis L in said first phase than in said final phase. The pitch of the first section 41a of the first pressure receiving contact surface 41 is preferably in the order of 5-8 times as large as the pitch of the second section 41b thereof, and the pitch of the first section 51a of the first pressure applying contact surface 51 is preferably in the order of 5-8 times as large as the pitch of the second section 51b thereof.

The first section 51a of the first pressure applying contact surface 51 preferably has the same pitch as the first section 41a of the first pressure receiving contact surface 41. Likewise, the second section 51b of the first pressure applying contact surface 51 preferably has the same pitch as the second section 41b of the first pressure receiving contact surface 41.

In the illustrated embodiments, the pitch is constant along the first section 41a of the first pressure receiving contact surface 41 and also constant, but smaller, along the second section 41b thereof. In the illustrated embodiments, the pitch is also constant along the first section 51a of the first pressure applying contact surface 51 and also constant, but smaller, along the second section 51b thereof. However, the pitch may as an alternative vary along one or both of the above-mentioned sections 41a, 41b of the first pressure receiving contact surface 41 and along one or both of the above-mentioned sections 51a, 51b of the first pressure applying contact surface 51.

In the illustrated embodiments, the first and second sections 41a, 41b of the first pressure receiving contact surface 41 are positioned adjacent to each other on the first motion transferring element 40, such that the second section 41b follows directly after the first section 41a. Likewise, the first and second sections 51a, 51b of the first pressure applying contact surface 51 are positioned adjacent to each other on the second motion transferring element 50, such that the second section 51b follows directly after the first section 51a. However, as an alternative, the first pressure receiving contact surface 41 could comprise an intermediate section positioned on the first motion transferring element 40 between the first and second sections 41a, 41b of the first pressure receiving contact surface 41. Likewise, the first pressure applying contact surface 51 could comprise an intermediate section positioned on the second motion transferring element 50 between the first and second sections 51a, 51b of the first pressure applying contact surface 51.

In the illustrated embodiments, the motion transferring mechanism is also configured to transfer a rotary movement of the actuating member 14 in a second rotary direction D2 in relation to the housing 2, opposite to the first rotary direction D1, into an axial movement of the drawbar 5 from the retracted locking position to the advanced releasing position. For this purpose, the first motion transferring element 40 is provided with a second pressure receiving contact surface 42, which faces towards the rear end 2b of the housing and which is configured to co-operate with a second pressure applying contact surface 62 provided on a third motion transferring element 60. This element 60 is fixed to the actuating member 14 so as to be rotatable in relation to the housing 2 and the drawbar 5 together with the actuating member. The second pressure applying contact surface 62 faces towards the front end 2a of the housing for contacting the second pressure receiving contact surface 42, wherein the second pressure applying contact surface 62 is configured to press the drawbar 5 from the retracted locking position to the advanced releasing position by sliding and pressing against the second pressure receiving contact surface 42 when the actuating member 14 is rotated in relation to the housing 2 in the second rotary direction D2.

The second pressure receiving contact surface 42 may comprises a first contact surface section 42a and a second contact surface section 42b arranged at different positions along the first motion transferring element 40, and the second pressure applying contact surface 62 may likewise comprise a first contact surface section 62a and a second contact surface section 62b arranged at different positions along the third motion transferring element 60. Upon a movement of the actuating member 14 in the second rotary direction D2, the first section 62a of the second pressure applying contact surface 62 is configured to slide and press against the first section 42a of the second pressure receiving contact surface 42 during a first phase of this movement and the second section 62b of the second pressure applying contact surface 62 is configured to slide and press against the second section 42b of the second pressure receiving contact surface 42 during a final phase of this movement. The first section 42a of the second pressure receiving contact surface 42 has a smaller pitch than the second section 42b thereof. Likewise, the first section 62a of the first pressure applying contact surface 62 has a smaller pitch than the second section 62b thereof. Hereby, the same angular displacement of the actuating member 14 in connection with a rotation thereof in the second rotary direction D2 in relation to the housing 2 will result in a longer axial movement of the drawbar 5 along the longitudinal axis L in the final phase of this rotary movement than in the first phase of this rotary movement. The pitch of the second section 42b of the second pressure receiving contact surface 42 is preferably in the order of 5-8 times as large as the pitch of the first section 42a thereof, and the pitch of the second section 62b of the second pressure applying contact surface 62 is preferably in the order of 5-8 times as large as the pitch of the first section 62a thereof.

The first section 62a of the second pressure applying contact surface 62 preferably has the same pitch as the first section 42a of the second pressure receiving contact surface 42. Likewise, the second section 62b of the second pressure applying contact surface 62 preferably has the same pitch as the second section 42b of the second pressure receiving contact surface 42.

In the illustrated embodiments, the pitch is constant along the first section 42a of the second pressure receiving contact surface 42 and also constant, but larger, along the second section 42b thereof. In the illustrated embodiments, the pitch is also constant along the first section 62a of the second pressure applying contact surface 62 and also constant, but larger, along the second section 62b thereof. However, the pitch may as an alternative vary along one or both of the above-mentioned sections 42a, 42b of the second pressure receiving contact surface 42 and along one or both of the above-mentioned sections 62a, 62b of the second pressure applying contact surface 62.

In the illustrated embodiments, the first and second sections 42a, 42b of the second pressure receiving contact surface 42 are positioned adjacent to each other on the first motion transferring element 40, such that the second section 42b follows directly after the first section 42a. Likewise, the first and second sections 62a, 62b of the second pressure applying contact surface 62 are positioned adjacent to each other on the third motion transferring element 60, such that the second section 62b follows directly after the first section 62a. However, as an alternative, the second pressure receiving contact surface 42 could comprise an intermediate section positioned on the first motion transferring element 40 between the first and second sections 42a, 42b of the second pressure receiving contact surface 42. Likewise, the second pressure applying contact surface 62 could comprise an intermediate section positioned on the third motion transferring element 60 between the first and second sections 62a, 62b of the second pressure applying contact surface 62.

The first motion transferring element 40 is received in a gap between the second and third motion transferring elements 50, 60. Thus, the second and third motion transferring elements 50, 60 are arranged on either side of the first motion transferring element 40, as seen in the axial direction of the actuating member 14.

Motion transferring elements 40, 50, 60 of the above-mentioned types may be arranged in two or more sets, where each set comprises a first motion transferring element 40 and associated second and third motion transferring elements 50, 60. These sets are spaced apart from each other in the circumferential direction of the actuating member 14. In the illustrated embodiments, the motion transferring mechanism of the clamping device 1 comprises two such sets of motion transferring elements.

In the illustrated embodiments, the motion transferring elements 40, 50, 60 form part of two threads, which are arranged in threaded engagement with each other. In this case, the first and second pressure receiving contact surfaces 41, 42 and the first and second pressure applying contact surfaces 51, 62 have the form of thread surfaces. As an alternative, each one of the first and second pressure applying contact surfaces 51, 62 could have the form of a rather short and convex surface arranged on a motion transferring element of a pin-like shape, with the first and second pressure receiving contact surfaces 41, 42 acting as cam surfaces for the first and second pressure applying contact surfaces. In the latter case, only the first and second pressure receiving contact surfaces 41, 42 are divided into first and second contact surface sections 41a, 41b, 42a, 42b in the manner described above.

As a further alternative, each one of the first and second pressure receiving contact surfaces 41, 42 could have the form of a rather short and convex surface arranged on a first motion transferring element of a pin-like shape, with the first and second pressure applying contact surfaces 51, 62 acting as cam surfaces for the first and second pressure receiving contact surfaces. In the latter case, only the first and second pressure applying contact surfaces 51, 62 are divided into first and second contact surface sections 51*a*, 51*b*, 62*a*, 62*b* in the manner described above.

The second contact surface section 41*b* of the first pressure receiving contact surface 41 and/or the second contact surface section 51*b* of the first pressure applying contact surface 51 preferably has such a pitch that the first and second motion transferring elements 40, 50 will keep the actuating member 14 in a self-locking rotary position in relation to the drawbar 5 when the drawbar has been forced into the retracted locking position under the effect of the actuating member 14 and the first and second motion transferring elements 40, 50. In the self-locking rotary position, frictional forces between the first pressure applying contact surface 51 and the first pressure receiving contact surface 41 prevent the actuating member 14 from being rotated in the above-mentioned second rotary direction D2.

In the illustrated embodiments, the first and second pressure receiving contact surfaces 41, 42 are provided on the outer side of a shaft 15, 15', which is fixed to the drawbar 5 and configured to move along the longitudinal axis L together with the drawbar. The drawbar 5 and the shaft 15 may be formed in one piece, as illustrated in FIGS. 1 and 4. However, the shaft 15' may as an alternative be formed as a separate component which is fixed to the drawbar 5, for instance through a threaded joint formed by an internal thread 16*a* in the shaft 15' and a corresponding external thread 16*b* on the drawbar 5, as illustrated in FIGS. 14 and 16. However, the shaft 15' may of course also be fixed to the drawbar 5 in any other suitable manner. In the illustrated examples, each one of the first motion transferring elements 40 has the form of an external projection on the envelop surface of the shaft 15, 15'.

In the illustrated embodiments, the actuating member 14 is sleeve-shaped and surrounds said shaft 15, 15', wherein the first and second pressure applying contact surfaces 51, 62 are provided on the inner side of the actuating member. In order to facilitate the assembling of the clamping device 1, the sleeve-shaped actuating member 14 is suitably formed by two separate sleeve sectors 14*a*, 14*b*, which are joined in order to form a sleeve and which are clamped to each other by means of clamping rings 17. In the illustrated examples, each one of the second and third motion transferring elements 50, 60 has the form of an internal projection on the inner side of the actuating member 14.

In the illustrated embodiments, the actuating member 14 and the second and third motion transferring elements 50, 60 together form a nut, which is configured to co-operate with a screw formed by the shaft 15, 15' and the first motion transferring elements 40.

As an alternative, the actuating member 14 may have the form of a shaft, wherein the first and second pressure applying contact surfaces 51, 62 are provided on the outer side of the actuating member. In this case, the first and second pressure receiving contact surfaces 41, 42 are provided on the inner side of a sleeve, which surrounds the shaft-shaped actuating member and which is fixed to the drawbar 5 and configured to move along the longitudinal axis L together with the drawbar. The drawbar 5 and this sleeve may be formed in one piece. However, the sleeve may as an alternative be formed as a separate component which is fixed to the drawbar 5, for instance through a threaded joint.

The drawbar 5 is prevented from rotating in relation to the housing 2. In the embodiment illustrated in FIGS. 1-11, the drawbar 5 is provided with a number of stop lugs 30, which project in radial direction from a peripheral wall of the drawbar and which are distributed about the centre axis of the drawbar. These stop lugs 30 are slidably received in a respective longitudinal groove 31 on a wall surface in the bore 3 in order to prevent mutual rotation between the drawbar 5 and the housing 2. In the embodiment illustrated in FIGS. 12-23, an elongated stop member 32 extends through an aperture 33 in a plate 34 which is non-rotatably mounted inside the housing 2, wherein this stop member 32 is slidably received in an axially extending recess 35 in the shaft 15' in order to prevent mutual rotation between the drawbar 5 and the housing 2. Mutual rotation between the drawbar 5 and the housing 2 may of course also be prevented in any other suitable manner.

The clamping device 1 may also comprise additional components, such as one or more hydraulic, pneumatic or electric actuators, for effecting the rotation of the actuating member 14 in the first and second rotary directions D1, D2. The control of the clamping device 1 may be automatized by means of such an actuator. Thus, the clamping device 1 according to the present invention is suitable for use in automatic tool changing operations. However, the clamping device 1 according to the present invention may also be adapted for manual operation.

In the illustrated embodiments, the clamping device 1 comprises a hydraulic actuator 70, 70' arranged in or mounted on the housing 2 and configured to rotate the actuating member 14 in relation to the housing 2. In the illustrated embodiments, the hydraulic actuator 70, 70' is integrated in the housing 2 of the clamping device. However, the hydraulic actuator 70, 70' may as an alternative comprise a separate actuator casing that is fixed to the housing of clamping device.

In the embodiment illustrated in FIGS. 1-11, the hydraulic actuator 70 comprises a rotatable actuator shaft 71, which is arranged with its axis of rotation in alignment with the axis of rotation of the actuating member 14. The actuating member 14 is configured to be rotatable in relation to the housing 2 together with the actuator shaft 71 in the above-mentioned first and second rotary directions D1, D2. The hydraulic actuator 70 also comprises two actuator vanes 72, which are fixed to the actuator shaft 71 and configured to be rotatable together with the actuator shaft 71 about the axis of rotation of the actuator shaft. The actuator vanes 72 project radially from the actuator shaft 71 in opposite directions. The actuator vanes 72 and the actuator shaft 71 are preferably formed in one piece. Each actuator vane 72 is moveably received in an internal space 73 of the hydraulic actuator 70 and configured to divide this internal space 73 into a first hydraulic chamber 74*a* on a first side of the actuator vane and a second hydraulic chamber 74*b* on an opposite second side of the actuator vane. Hydraulic fluid, for instance in the form of hydraulic oil, can be fed into and discharged from the first hydraulic chambers 74*a* through a respective first inlet and outlet port 75*a* and fed into and discharged from the second hydraulic chambers 74*b* through a respective second inlet and outlet port 75*b*. The actuating member 14 is rotatable together with the actuator shaft 71 and the actuator vanes 72 in the first rotary direction D1 by feeding of hydraulic fluid into the first hydraulic chambers 74*a* and in the second rotary direction D2 by feeding of hydraulic fluid into the second hydraulic chambers 74*b*.

In embodiment illustrated in FIGS. 1-11, the hydraulic actuator 70 comprises a cylindrical cavity 76, which is limited in radial direction outwards by a cylindrical wall 77 of the housing 2, wherein the above-mentioned internal spaces 73 form part of this cylindrical cavity 76. The actuator shaft 71 is rotatably arranged in the cylindrical cavity 76 with its longitudinal axis coinciding with the centre axis of the cylindrical cavity. A longitudinal outer edge 72a of each actuator vane 72 is in contact with the cylindrical wall 77. If so desired, an elongated sealing member may be arranged along the longitudinal outer edge 72a of each actuator vane 72 in order to form a fluid-tight seal at the interface between the actuator vane 72 and the cylindrical wall 77 and thereby prevent hydraulic fluid from leaking from one hydraulic chamber to the other through this interface. However, a smaller leakage of hydraulic fluid between the hydraulic chambers 74a, 74b may be accepted without impairing the functionality of the hydraulic actuator 70, and such sealing members are therefore not necessary.

Figure 6:
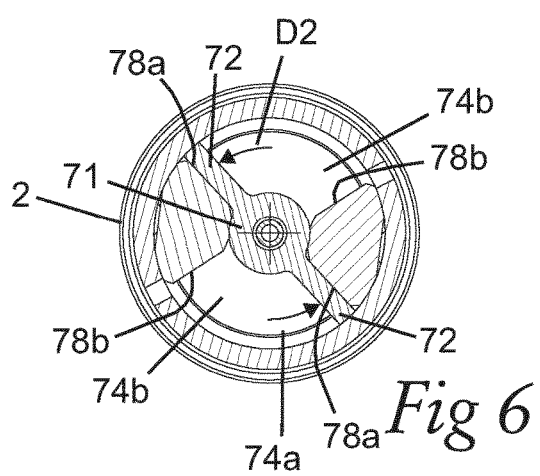
FIG. 6 is a cross-section according to the line VI-VI in FIG. 5.
Figure 7:
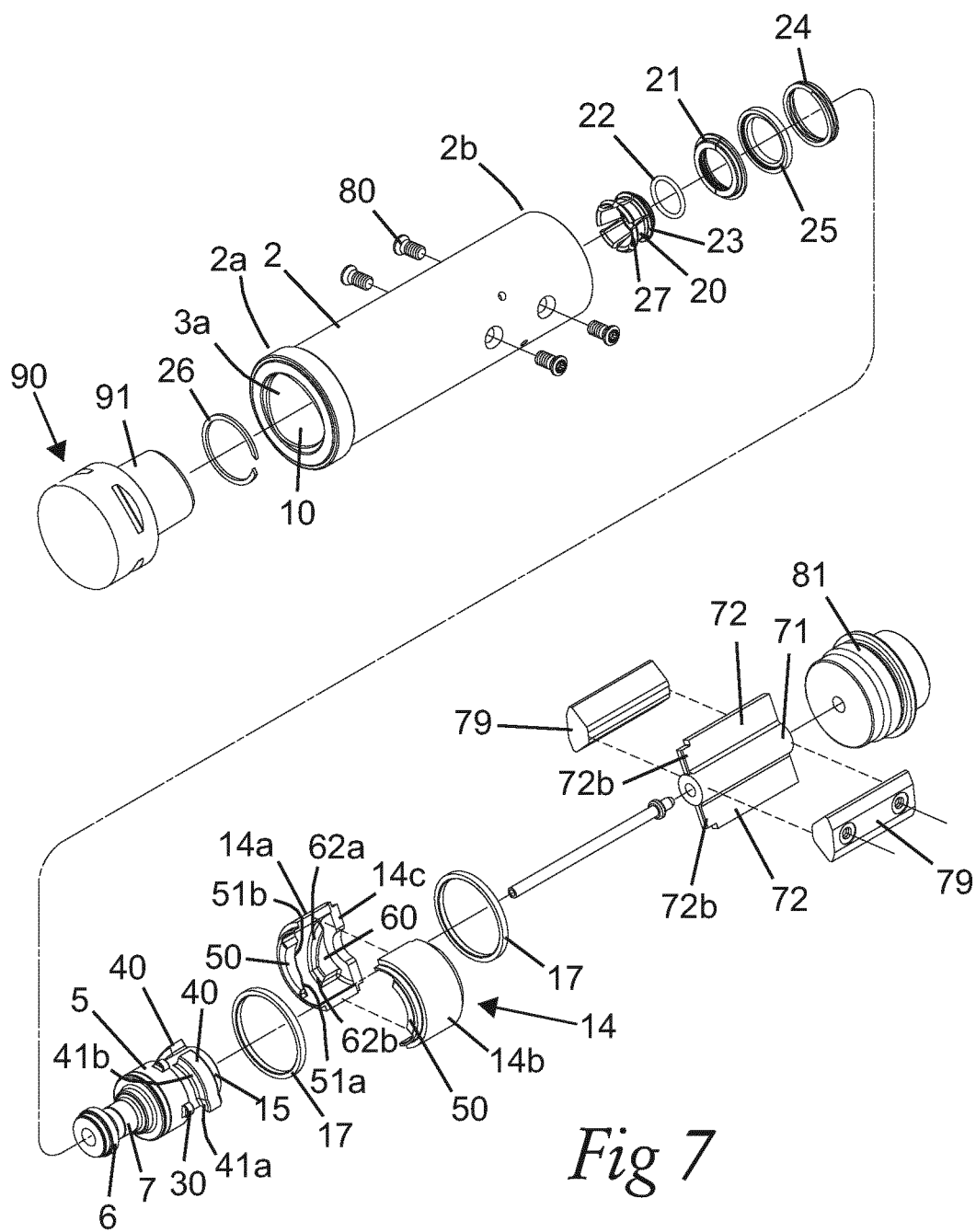
FIG. 7 is an exploded view of the clamping device and tool holder of FIG. 1.
Figure 8:
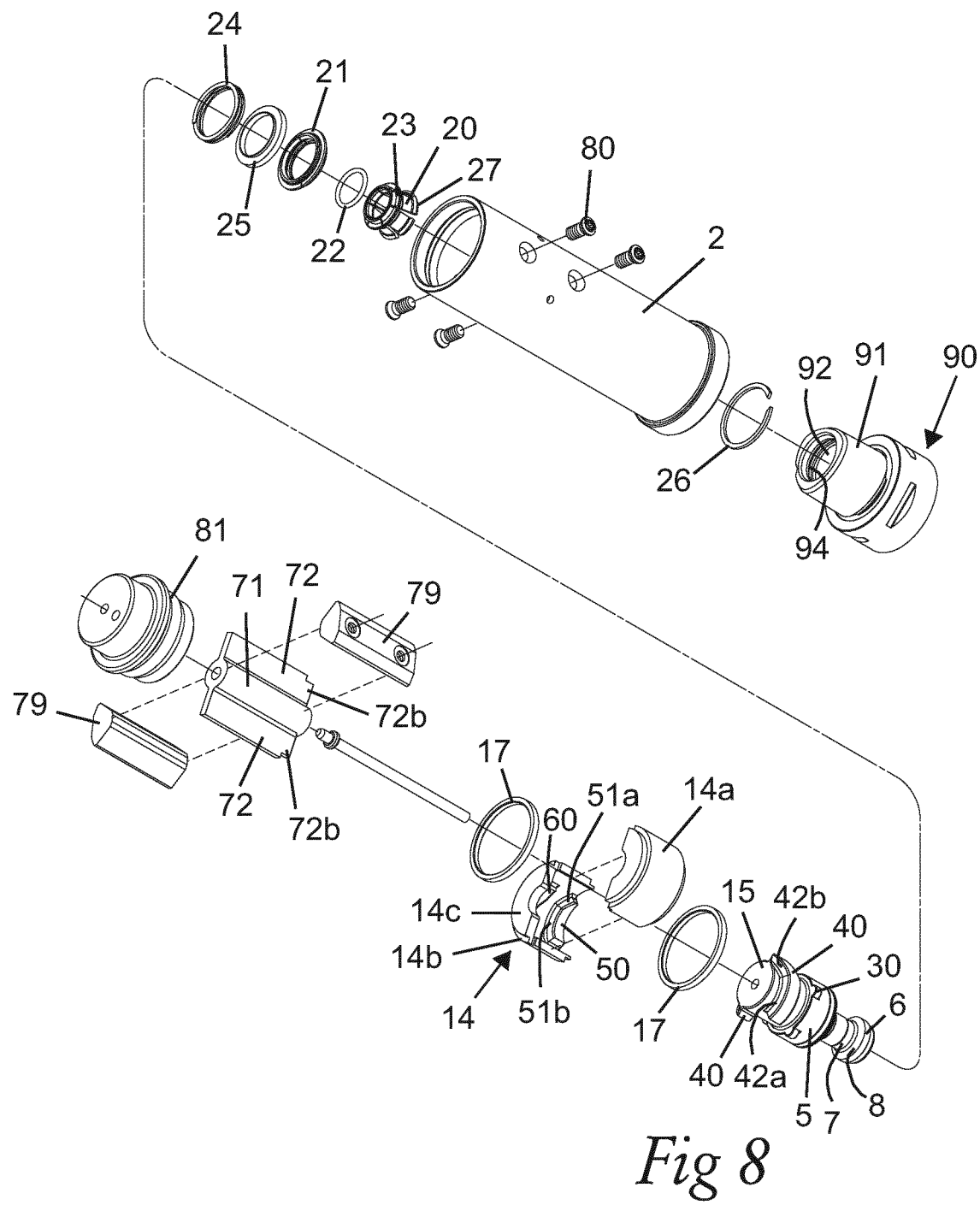
FIG. 8 is an exploded view from another direction of the clamping device and tool holder of FIG. 1.
Figure 12:
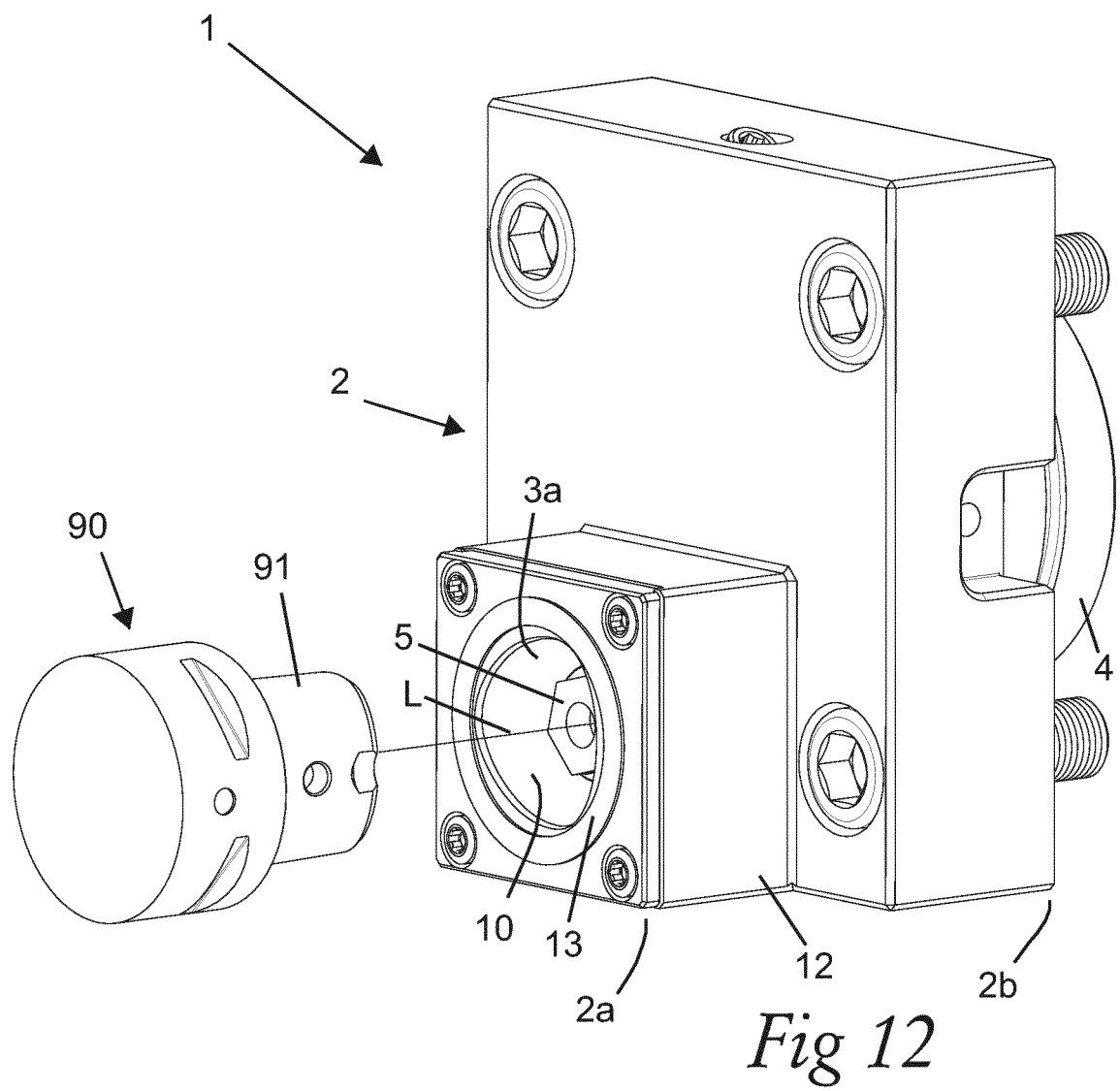
FIG. 12 is a perspective view of a clamping device according to another embodiment of the invention and a tool holder.
Figure 13:
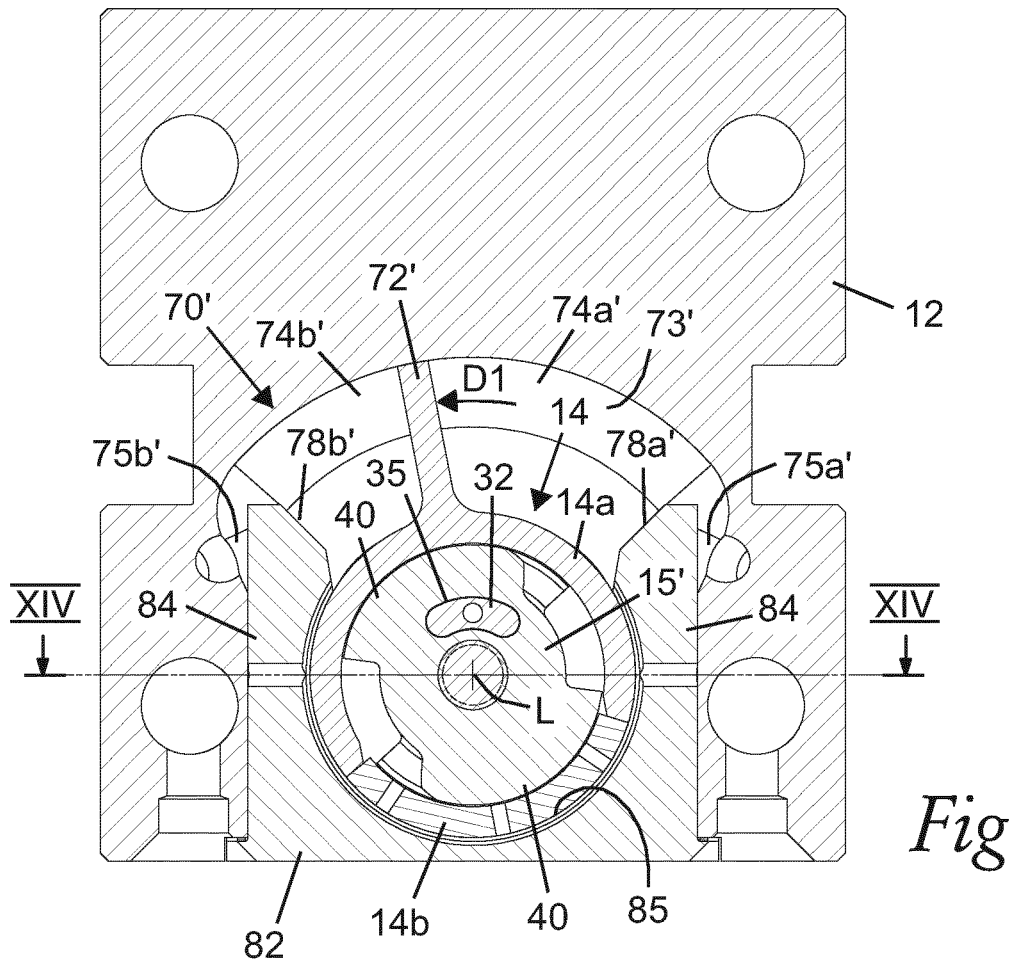
FIG. 13 is a cross-section through the clamping device of FIG. 12, with an actuator vane of the clamping device shown in a first position.

Each one of the above-mentioned internal spaces 73 extends in the circumferential direction of the cylindrical cavity 76 between first and second chamber walls 78a, 78b, which are arranged inside the cylindrical cavity 76 and extend in the longitudinal direction thereof along the hydraulic chambers 74a, 74b. The first chamber wall 78a faces the first hydraulic chamber 74a and is configured to limit this hydraulic chamber 74a in a circumferential direction of the cylindrical cavity 76. The second chamber wall 78b faces the second hydraulic chamber 74b and is configured to limit this hydraulic chamber 74b in a circumferential direction of the cylindrical cavity 76. The actuator vanes 72 are configured to come into contact with the first chamber walls 78a when the drawbar 5 has reached the advanced releasing position, as illustrated in FIG. 6, to thereby prevent further movement of the drawbar 5 towards the front end 2a of the housing 2.

The precise axial position of the drawbar 5 in the bore 3 depends on the tolerances of the tool holder shank 91 and the mounting portion 10 and it is therefore not possible to predict the precise end position of the actuator vanes 72 in the first rotary direction D1. Thus, the actuator vanes 72 can not be configured to reach the second chamber walls 78b when the drawbar 5 assumes its retracted locking position. Consequently, each actuator vane 72 is configured to assume a position somewhere between the associated first and second chamber walls 78a, 78b when the drawbar 5 has reached the retracted locking position, as illustrated in FIG. 3.

The first and second chamber walls 78a, 78b are with advantage configured to form part of elongated partition elements 79, preferably in the form of solid bodies, which are mounted inside the cylindrical cavity 76 and extend along the cylindrical cavity 76 in the longitudinal direction thereof. These partition elements 79 are fixed to the cylindrical wall 77, for instance by means of screws 80.

In the embodiment illustrated in FIGS. 1-11, the above-mentioned internal spaces 73 are limited in a first axial direction by a rear end wall 14c on the actuating member 14 and in the opposite axial direction by an end piece 81, which is fixed to the housing 2 at the rear end 2b thereof.

In the embodiment illustrated in FIGS. 1-11, an end part 72b at the front end of each actuator vane 72 is received in a radially extending recess in the rear end wall 14c of the actuating member 14 in order to allow transmission of torque from the actuator vanes 72 to the actuating member 14 and prevent the actuating member from rotating in relation to the actuator vanes 72 and the actuator shaft 71. However, the actuating member 14 may of course also be non-rotatably connected to the actuator vanes 72 and/or the actuator shaft 71 in any other suitable manner.

In embodiment illustrated in FIGS. 1-11, the hydraulic actuator 70 comprises two actuator vanes 72. However, the hydraulic actuator may as an alternative comprise more than two actuator vanes 72 evenly distributed about the actuator shaft 71 and received in a respective internal space of the hydraulic actuator, or one single actuator vane 72.

In the embodiment illustrated in FIGS. 12-23, the hydraulic actuator 70' comprises an actuator vane 72', which is fixed to the actuating member 14 and configured to be rotatable in relation to the housing 2 together with the actuating member 14. The actuator vane 72' projects radially from the actuating member 14. The actuator vane 72' and one of the sleeve sectors 14a of the actuating member 14 are preferably formed in one piece. The actuator vane 72' is moveably received in an internal space 73' of the hydraulic actuator and configured to divide this internal space 73' into a first hydraulic chamber 74a' on a first side of the actuator vane and a second hydraulic chamber 74b' on an opposite second side of the actuator vane. Hydraulic fluid, for instance in the form of hydraulic oil, can be fed into and discharged from the first hydraulic chamber 74a' through a first inlet and outlet port 75a' and fed into and discharged from the second hydraulic chamber 74b' through a second inlet and outlet port 75b'. The actuating member 14 is rotatable together with the actuator vane 72' in the first rotary direction D1 by feeding of hydraulic fluid into the first hydraulic chamber 74a' and in the second rotary direction D2 by feeding of hydraulic fluid into the second hydraulic chamber 74b'.

A first chamber wall 78a' is arranged at a first end of the internal space 73' and a second chamber wall 78b' is arranged at an opposite second end of the internal space 73', as seen in the rotary directions of the actuator vane 72', wherein the first chamber wall 78a' faces the first hydraulic chamber 74a' and the second chamber wall 78b' faces the second hydraulic chamber 74b'. The actuator vane 72' is configured to come into contact with the first chamber walls 78a' when the drawbar 5 has reached the advanced releasing position, as illustrated in FIG. 16, to thereby prevent further movement of the drawbar 5 towards the front end 2a of the housing 2. The actuator vane 72' is configured to assume a position somewhere between the first and second chamber walls 78a', 78b' when the drawbar 5 has reached the retracted locking position, as illustrated in FIG. 14.

In the embodiment illustrated in FIGS. 12-23, the housing 2 comprises an insert piece 82, which is mounted to the above-mentioned base part 12 of the housing through an aperture 83 (see FIG. 19) in an external wall of the base part. The insert piece 82 comprises two legs 84, and an essentially U-shaped seat 85 for the actuating member 14 is formed between these legs, wherein the actuating member 14 is rotatably received in this seat 85. The actuator vane 72' extends through an opening provided between the free ends of the legs 84. The above-mentioned first chamber wall 78a' is formed by a surface at the free end of one of the legs 84 and the second chamber wall 78b' is formed by a surface at the free end of the other leg 84.

When a tool holder 90 is to be clamped to the housing 2, the tool holder shank 91 is inserted into the mounting portion 10 of the bore 3 with the drawbar 5 positioned in the advanced releasing position, as illustrated in FIGS. 4 and 16. Hereby, the head portion 6 of the drawbar is received in the engagement bore 92 in the tool holder shank 91 and the engagement groove 94 in the tool holder shank 91 is positioned on the outside of the engagement flanges 27 of the engagement members 20. Thereupon, hydraulic fluid is fed into the first hydraulic chamber 74a' or chambers 74a in order to rotate the actuator shaft 14 in the first rotary direction D1. During a first phase of this rotary movement of the actuating member 14, the first section 51a of the first pressure applying contact surface 51 will slide and press against the first section 41a of the first pressure receiving contact surface 41. Hereby, the drawbar 5 will be axially displaced rearwards in the bore 3 towards the retracted locking position. The relatively large pitch of said sections 41a, 51a will result in a relatively quick displacement of the drawbar 5. The relatively large pitch is advantageous since the initial displacement of the drawbar 5 does not require much force. The first and second sections 51a, 51b of the first pressure applying contact surface 51 and the first and second sections 41a, 41b of the first pressure receiving contact surface 41 are so arranged that when the actuating member 14 has been subjected to such an angular displacement that the first section 51a of the first pressure applying contact surface 51 has passed the first section 41a of the first pressure receiving contact surface 41 and the second section 51b of the first pressure applying contact surface 51 reaches the second section 41b of the first pressure receiving contact surface 41, i.e. at the transition between these respective sections, the drawbar 5 has almost reached its final retracted position in the bore 3. Hence, for the final clamping phase, in which a large force is beneficial, the second sections 51b, 41b of the first pressure applying and receiving contact surfaces 41, 51 are active. In this phase, a relatively large angular displacement of the actuating member 14 will result in a very small axial displacement of the drawbar 5, which consequently will provide a force amplifying effect that will make it possible for the drawbar 5 to pull the tool holder shank 91 with a large force into firm engagement with the housing 2. Furthermore, the small pitch of the second sections 51b, 41b of the first pressure applying and receiving contact surfaces 51, 41 will provide a self-locking effect and make sure that the clamping device 1 will remain in the clamped state without requiring any additional locking means. Hereby, the force on the actuating member 14 may be released when the drawbar 5 has reached the retracted locking position.

When a tool changing operation is to be performed and the tool holder 90 is to be released from the housing 2, hydraulic fluid is fed into the second hydraulic chamber 74b' or chambers 74b in order to rotate the actuator member 14 in the second rotary direction D2. When the actuating member 14 is subjected to a sufficient force in the second rotary direction D2, the self-locking frictional engagement between the second sections 51b, 41b of the first pressure applying and receiving contact surfaces 51, 41 will be released, whereupon the actuating sleeve 14 is rotatable in relation to the housing 2 in the second rotary direction D2 in order to push the drawbar 5 axially forwards in the bore 3 towards the advanced releasing position. During a first phase of this rotary movement of the actuating member 14, the first section 62a of the second pressure applying contact surface 62 will slide and press against the first section 42a of the second pressure receiving contact surface 42, whereupon the second section 62b of the second pressure applying contact surface 62 will slide and press against the second section 42b of the second pressure receiving contact surface 42 during a subsequent final phase of this rotary movement of the actuating member 14. When the drawbar 5 is moved towards the advanced releasing position, the outer end of the head portion 6 of the drawbar 5 will hit against a surface 95 in the engagement bore 92 in the tool holder shank 91 and thereby release the tool holder shank 91 from the housing 2.

The invention is of course not in any way restricted to the embodiments described above. On the contrary, many possibilities to modifications thereof will be apparent to a person with ordinary skill in the art without departing from the basic idea of the invention such as defined in the appended claims.

The invention claimed is:

1. A clamping device for releasably holding a tool holder shank, the clamping device comprising:
    a housing having a front end, a rear end and a bore which intersects the front end and extends rearwardly therefrom, wherein a mounting portion for receiving the tool holder shank is provided at a front end of the bore;
    a drawbar slidably mounted inside the bore so as to be reciprocally moveable in the bore along a longitudinal axis thereof between an advanced releasing position and a retracted locking position; and
    engagement members arranged around the drawbar at a front end thereof, wherein the engagement members, under the effect of a movement of the drawbar from the advanced releasing position to the retracted locking position, are moveable from a first position, in which the engagement members allow the tool holder shank to move into and out of said mounting portion of the bore, to a second position, in which the engagement members are in locking engagement with the tool holder shank and keep it secured to the housing;
    an actuating member rotatably arranged in the bore so as to be rotatable about the longitudinal axis, wherein the actuating member is axially fixed in relation to the housing so as to be prevented from moving along the longitudinal axis; and
    a motion transferring mechanism arranged inside the housing, wherein the motion transferring mechanism is configured to transfer a rotary movement of the actuating member in a first rotary direction in relation to the housing into an axial movement of the drawbar from the advanced releasing position to the retracted locking position, wherein the motion transferring mechanism comprises:
    a first motion transferring element, which is fixed to or fixedly connected to the drawbar so as to be moveable along the longitudinal axis together with the drawbar and which is provided with a first pressure receiving contact surface facing towards the front end of the housing; and
    a second motion transferring element, which is fixed to the actuating member so as to be rotatable in relation to the housing and the drawbar together with the actuating member and which is provided with a first pressure applying contact surface facing towards the rear end of the housing for contacting the first pressure receiving contact surface, wherein the first pressure applying contact surface is configured to press the drawbar from the advanced releasing position to the retracted locking position by sliding and pressing against the first pressure receiving contact surface when the actuating member is rotated in the first rotary direction; and wherein at least one of said contact surfaces includes a first contact surface section and a second contact surface section arranged at different positions along an associated motion transferring element, such that, upon a movement of the actuating member in the first rotary direction, the first contact surface section is configured to slide against the other contact surface during a first phase of the movement and the second contact surface section is configured to slide against the other contact surface during a final phase of the movement, wherein the first contact surface section has a larger pitch than the second contact surface section such that the same angular displacement of the actuating member in connection with a rotation thereof in the first rotary direction in relation to the housing results in a longer axial movement of the drawbar in said first phase than in said final phase.

2. The clamping device according to claim 1, wherein the pitch is constant along said second contact surface section.

3. The clamping device according to claim 1, wherein the pitch is constant along said first contact surface section.

4. The clamping device according to claim 3, wherein the second contact surface section is positioned on the associated motion transferring element adjacent to said first contact surface section, such that the second contact surface section follows directly after the first contact surface section.

5. The clamping device according to claim 1, wherein the second contact surface section has a pitch such that the first and second motion transferring elements will keep the actuating member in a self-locking rotary position in relation to the drawbar when the drawbar has been forced into the retracted locking position under the effect of the actuating member and the first and second motion transferring elements.

6. The clamping device according to claim 1, wherein the first pressure receiving contact surface includes the first and second contact surface sections.

7. The clamping device according to claim 6, wherein the first contact surface section of the first pressure applying contact surface is configured to slide and press against the first contact surface section of the first pressure receiving contact surface during said first phase of the rotary movement of the actuating member in the first rotary direction, and wherein the second contact surface section of the first pressure applying contact surface is configured to slide and press against the second contact surface section of the first pressure receiving contact surface during the final phase of this rotary movement.

8. The clamping device according to claim 7, wherein the first contact surface section of the first pressure applying contact surface has the same pitch as the first contact surface section of the first pressure receiving contact surface, and the second contact surface section of the first pressure applying contact surface has the same pitch as the second contact surface section of the first pressure receiving contact surface.

9. The clamping device according to claim 1, wherein the first pressure applying contact surface includes the first and second contact surface sections.

10. The clamping device according to claim 1, wherein the first and second motion transferring elements form part of two threads, which are arranged in threaded engagement with each other, wherein said contact surfaces have the form of thread surfaces.

11. The clamping device according to claim 1, wherein the first motion transferring element has a form of an external projection on an envelope surface of a shaft which is fixed to the drawbar, and wherein the actuating member is sleeve-shaped and surrounds said shaft, wherein the second motion transferring element has a form of an internal projection on the actuating member.

12. The clamping device according to claim 1, wherein the motion transferring mechanism is configured to transfer a rotary movement of the actuating member in a second rotary direction, opposite to the first rotary direction, into an axial movement of the drawbar from the retracted locking position to the advanced releasing position.

13. The clamping device according to claim 12, wherein the first motion transferring element is provided with a second pressure receiving contact surface facing towards the rear end of the housing, and wherein the motion transferring mechanism includes a third motion transferring element, which is fixed to the actuating member so as to be rotatable in relation to the housing together with the actuating member and which is provided with a second pressure applying contact surface facing towards the front end of the housing for contacting the second pressure receiving contact surface, wherein the second pressure applying contact surface is configured to press the drawbar from the retracted locking position to the advanced releasing position by sliding and pressing against the second pressure receiving contact surface when the actuating member is rotated in the second rotary direction.

14. The clamping device according to claim 13, wherein the second pressure receiving contact surface includes a first contact surface section and a second contact surface section arranged at different positions along the first motion transferring element, such that, upon a movement of the actuating member in the second rotary direction, the second pressure applying contact surface is configured to slide and press against the first contact surface section of the second pressure receiving contact surface during a first phase of this movement and against the second contact surface section of the second pressure receiving contact surface during a final phase of this movement, wherein the first contact surface section of the second pressure receiving contact surface has a smaller pitch than the second contact surface section of the second pressure receiving contact surface such that the same angular displacement of the actuating member in connection with a rotation thereof in the second rotary direction in relation to the housing results in a longer axial movement of the drawbar in the final phase of this rotary movement than in the first phase of this rotary movement.

15. The clamping device according to claim 1, wherein the motion transferring mechanism includes two or more sets of the motion transferring elements, each set a of the two or more sets including the first motion transferring element and an associated second motion transferring element, wherein the two or more sets are spaced apart from each other in a circumferential direction of the actuating member.

* * * * *